(12) United States Patent
Bernetich et al.

(10) Patent No.: US 10,737,449 B2
(45) Date of Patent: Aug. 11, 2020

(54) TEXTURED CAUL PLATE

(71) Applicant: The Boeing Company, Chicago, IL (US)

(72) Inventors: Karl R. Bernetich, Wilmington, DE (US); James W. Kohlbrenner, Prospect Park, PA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/443,780

(22) Filed: Jun. 17, 2019

(65) Prior Publication Data

US 2019/0299552 A1    Oct. 3, 2019

Related U.S. Application Data

(62) Division of application No. 14/834,925, filed on Aug. 25, 2015, now Pat. No. 10,369,756.

(51) Int. Cl.
*B29C 70/44* (2006.01)
*B29D 7/01* (2006.01)
*B29C 70/54* (2006.01)

(52) U.S. Cl.
CPC ............... *B29D 7/01* (2013.01); *B29C 70/44* (2013.01); *B29C 70/546* (2013.01); *B29C 70/547* (2013.01); *Y02T 50/43* (2013.01)

(58) Field of Classification Search
CPC ...... B29C 70/44; B29C 70/546; B29C 70/547
USPC ......................................................... 264/165
See application file for complete search history.

(56) References Cited

U.S. PATENT DOCUMENTS

| | | |
|---|---|---|
| 4,268,473 A | 5/1981 | Bower et al. |
| 4,689,102 A | 8/1987 | Prawdzik et al. |
| 4,913,639 A | 4/1990 | Wheeler |
| 7,052,734 B2 | 5/2006 | Strait |
| 2013/0143006 A1 | 6/2013 | Ferguson |

OTHER PUBLICATIONS

Grigoriev et al., "Porosity-Free Molded Surfaces for Out-of-Autoclave Composites," SME Technical Paper TP14PUB29, Apr. 8, 2014.

*Primary Examiner* — Christina A Johnson
*Assistant Examiner* — Xue H Liu

(57) ABSTRACT

A system for manufacturing a composite article includes a resin-wetting control layer configured to be placed in contact with a composite ply of a composite preform. The resin-wetting control layer is configured complementary to a ply surface of the composite ply.

20 Claims, 16 Drawing Sheets

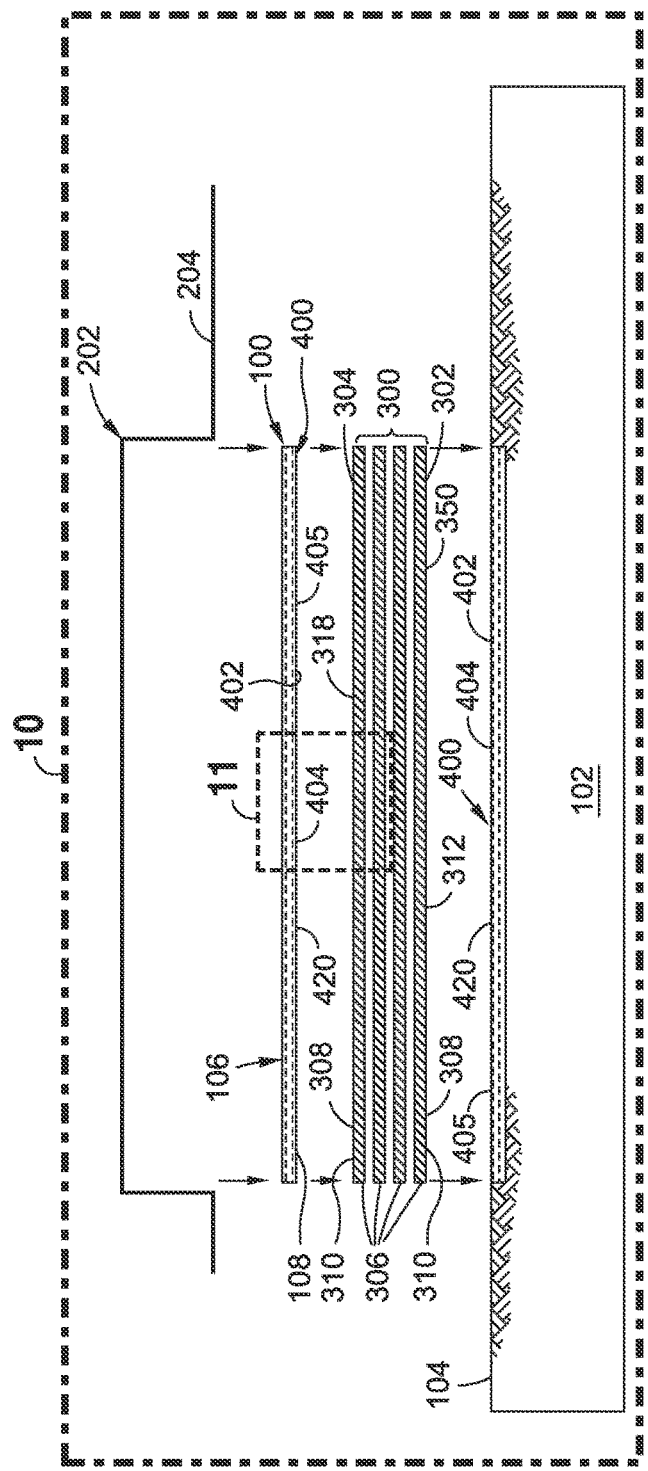
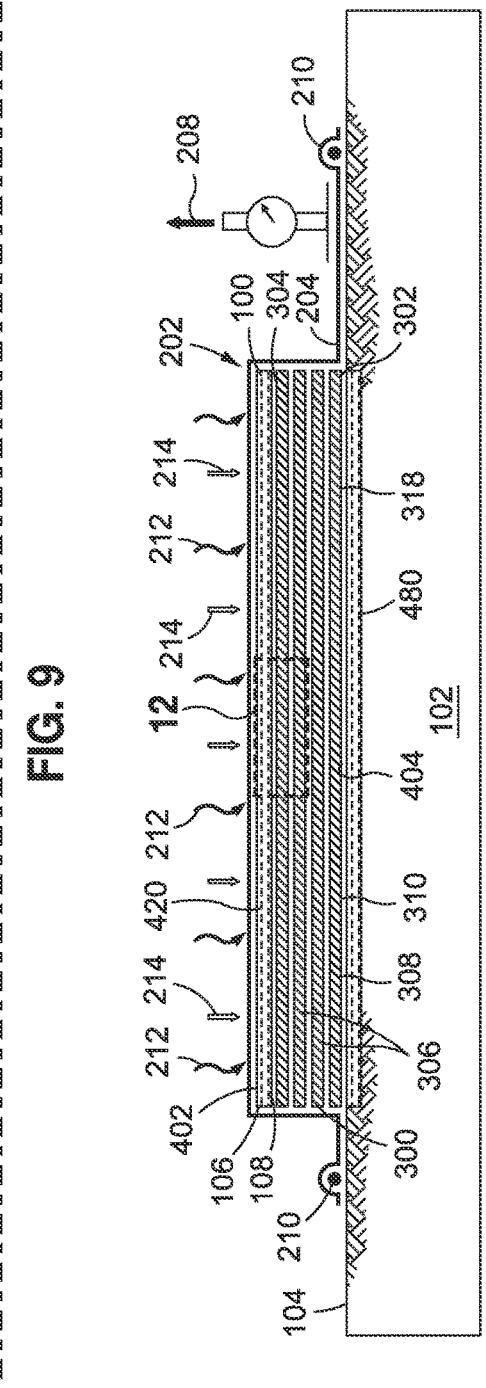

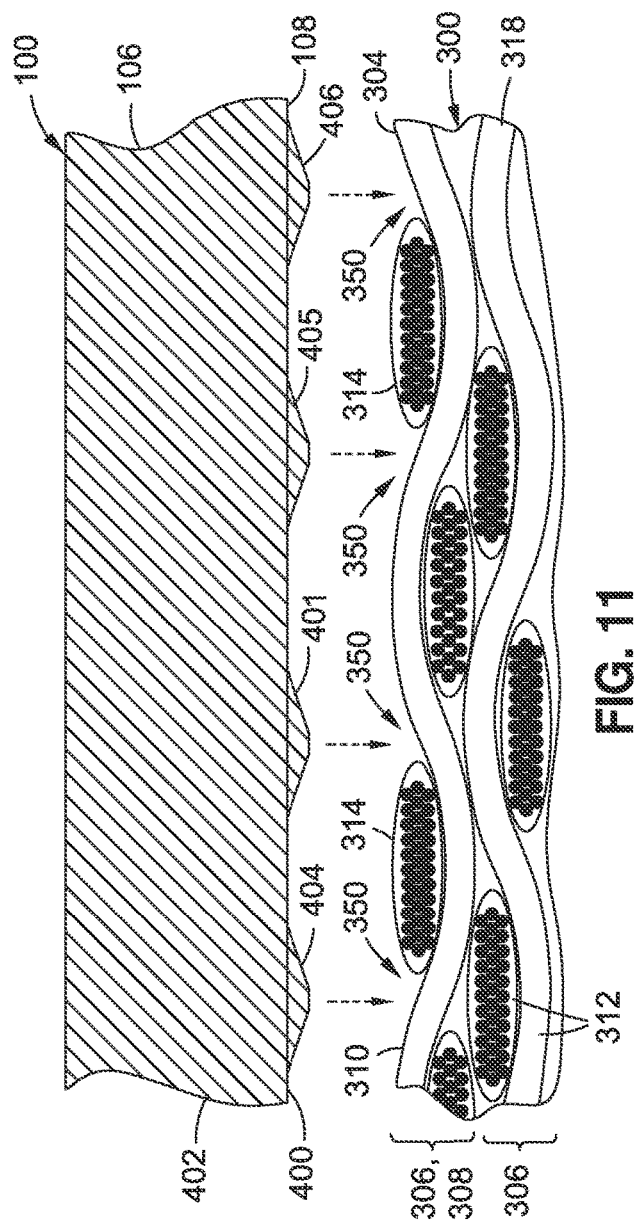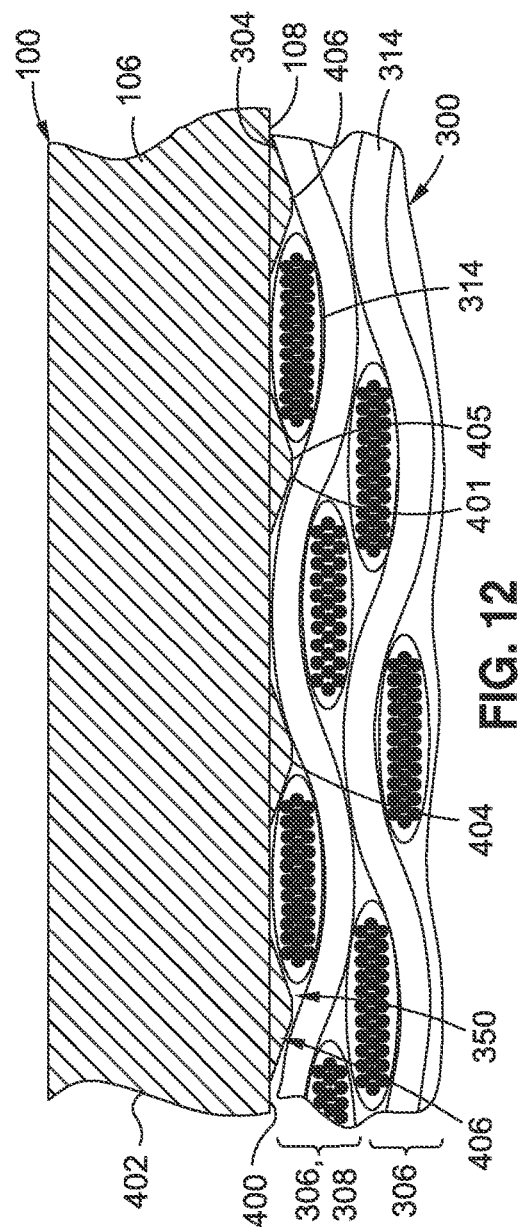

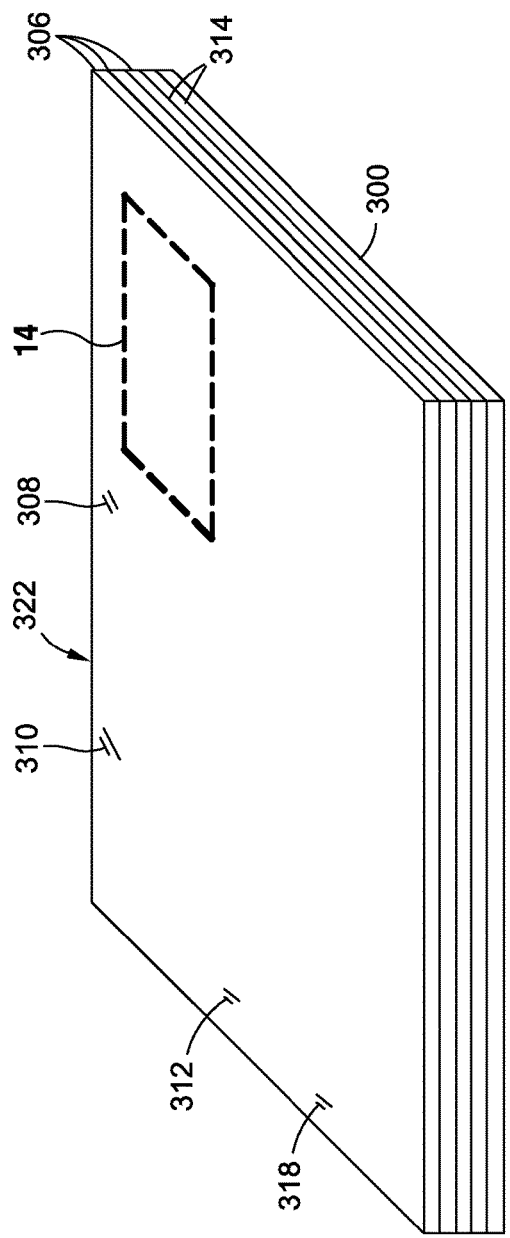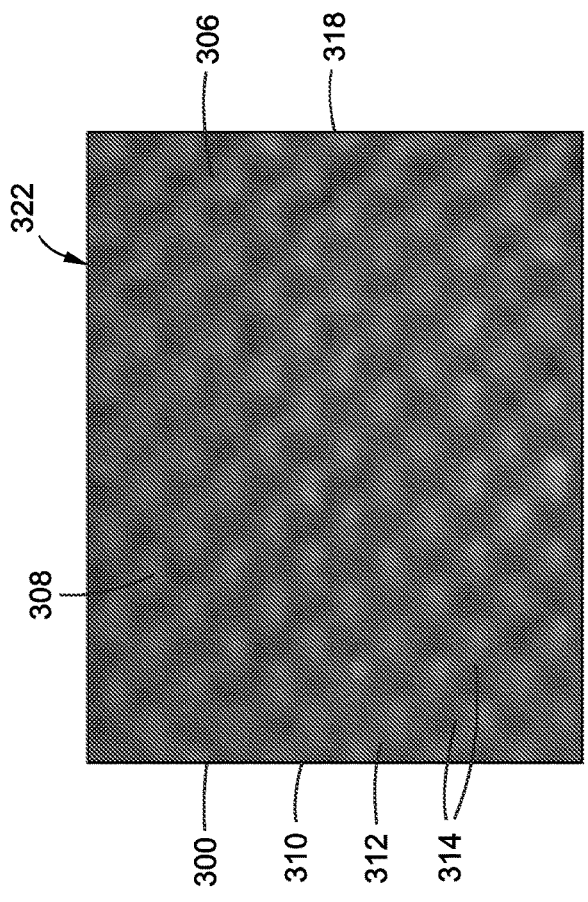
FIG. 13
FIG. 14

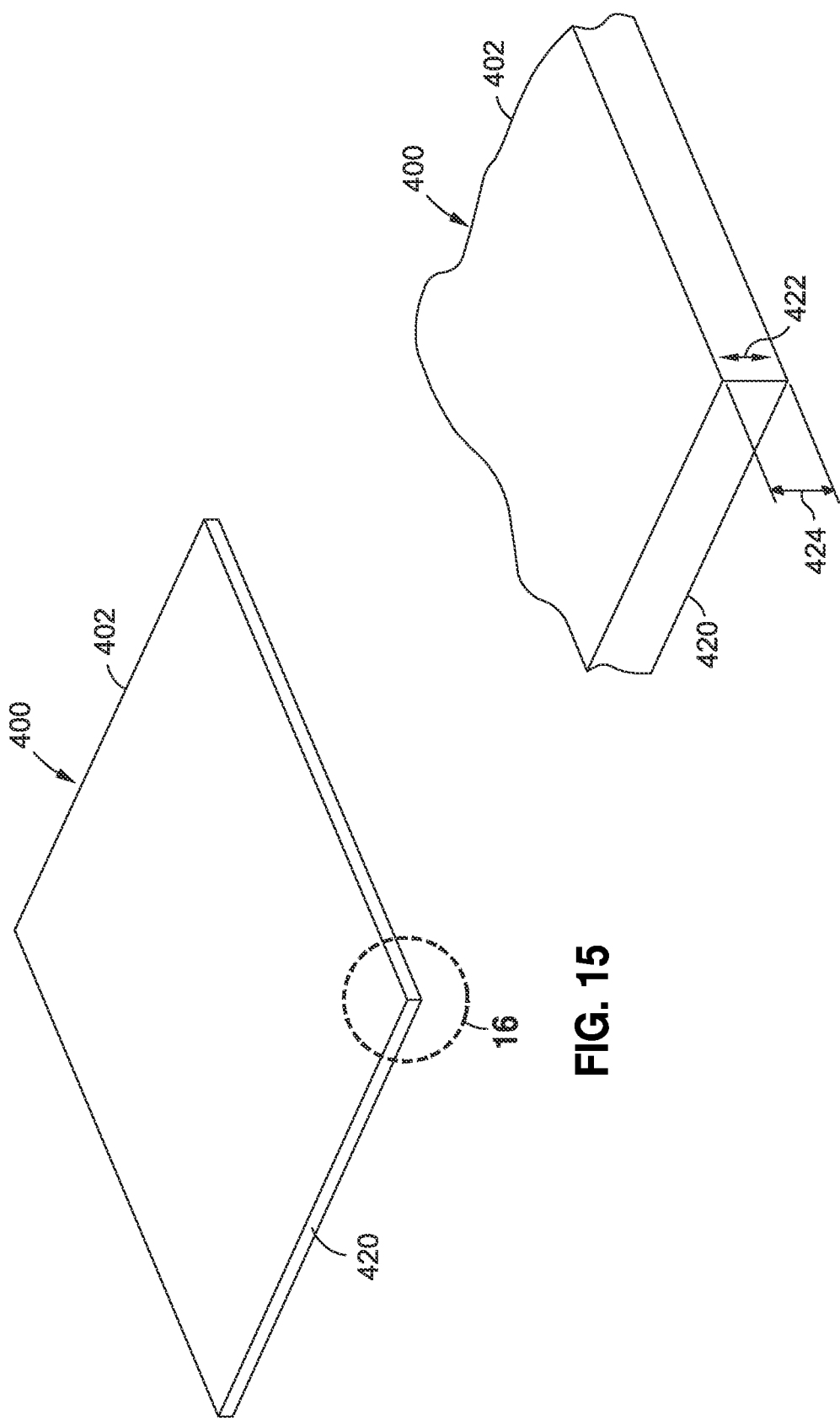

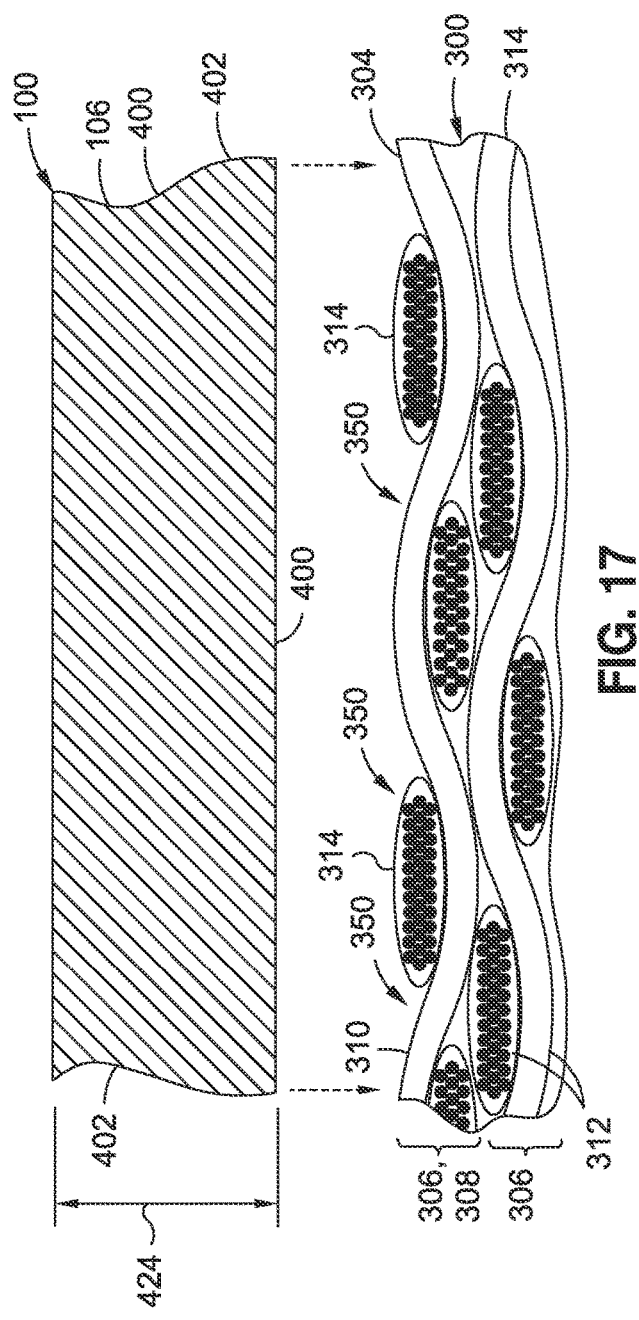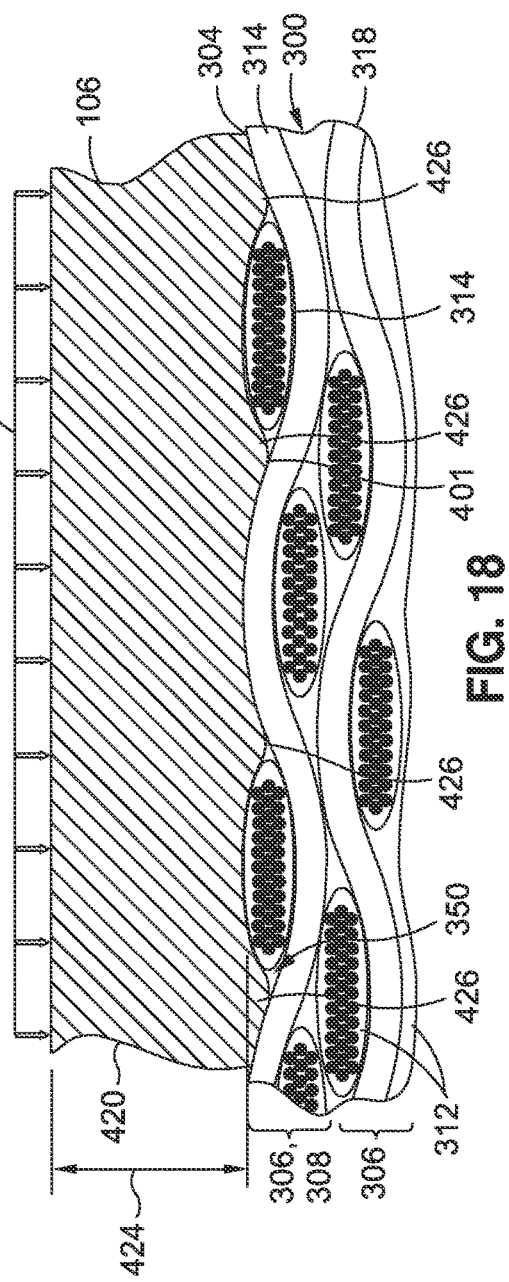

TEXTURED CAUL PLATE

CROSS-REFERENCE TO RELATED APPLICATIONS

The present application is a divisional application of and claims priority to pending U.S. application Ser. No. 14/834,925 filed on Aug. 25, 2015, and entitled TEXTURED CAUL PLATE AND METHOD OF USE, the entire contents of which is expressly incorporated by reference herein.

FIELD

The present disclosure relates generally to manufacturing composite articles and, more particularly, to a resin-wetting control layer and method of use for reducing or preventing surface porosity in cured composite articles.

BACKGROUND

Composite structures are used in a wide variety of applications due to their high strength-to-weight ratio, improved corrosion resistance, and other favorable properties. In aircraft construction, composites are used in increasing quantities to form the fuselage, wings, horizontal and vertical stabilizer, and other components. Composite articles may be formed by laying up composite plies comprised of reinforcing fibers impregnated with polymer matrix material. The composite plies may be laid up on a forming tool having a tool surface contour matching the desired contour of the cured composite article.

In some cases, a caul plate may be positioned on top of the composite layup such that the composite layup is sandwiched between the caul plate and the forming tool. The caul plate may impart a desired contour and surface finish into the surface of the composite layup. Heat and/or pressure may be applied to the caul plate and/or composite layup to promote resin cure and to reduce the resin viscosity to facilitate resin flow such that the resin in the composite plies may intermingle.

In some examples, a release coating such as Frekote™ may be applied to the tool surfaces prior to layup of the composite plies. A release coating may also be applied to the caul plate surfaces prior to positioning of the caul plate on top of the composite layup. The release coating may prevent bonding between the composite layup and the forming tool and/or caul plate surfaces to allow the composite article to be removed from the forming tool after cure. Unfortunately, the release coating may result in non-uniform wetting of the surfaces of the composite layup which may result in the occurrence of surface porosity in the cured composite article.

Attempts to reduce the occurrence of surface porosity in the composite article include the use of peel plies which may be applied to the tool surface of the forming tool prior to layup of the composite plies on the tool surface and/or prior to the application of the caul plate over the composite layup. In some examples, peel plies may be adhesively-bonded to the surfaces of the forming tool and/or the caul plate. The peel plies may promote the uniform wetting of the surfaces of the composite layup during cure and may thereby reduce the occurrence of surface porosity in the cured composite article.

Unfortunately, the application of the peel plies to the tool surface of the forming tool and/or caul surface of the caul plate is a time-consuming process. In addition, the peel plies must be replaced after each cure cycle which may present challenges due to difficulties in separating the adhesively-bonded peel plies from the forming tool or caul plate. Furthermore, the surfaces of the forming tool and caul plate must be cleaned and prepared for the re-application of peel plies prior to each new cure cycle. In some examples, the peel plies may cause the formation of wrinkles in the outer surfaces of the cured composite article and which may require time-consuming rework.

As can be seen, there exists a need in the art for a system and method for reducing or preventing surface porosity in composite articles that avoids the drawbacks associated with peel plies.

SUMMARY

The above-noted needs associated with preventing surface porosity in composite articles are specifically addressed and alleviated by the present disclosure which provides a system for manufacturing a composite article. The system may include a resin-wetting control layer configured to be placed in contact with a composite ply of a composite preform. The resin-wetting control layer may be configured complementary to a ply surface of the composite ply for reducing surface porosity of the ply surface.

In a further embodiment, disclosed is a system for manufacturing a composite article including at least one of a forming tool and a caul plate. The forming tool may have a tool surface. The caul plate may have a caul surface. The tool surface and the caul surface may be configured to be in contact with a respective tool side and a caul side of a composite preform including at least one outermost ply formed of woven fabric having a plurality of divots. The resin-wetting control layer may be associated with at least one of the tool surface and the caul surface and may be configured to reduce surface porosity in the respective tool side and caul side of the composite preform. The resin-wetting control layer may be formed as an elastomeric layer which may be compliant along a through-the-thickness direction, and which may optionally include a surface texture configured complementary to the divots in the outermost ply.

Also disclosed is a method of manufacturing a composite article including the step of complementarily mating a resin-wetting control layer with a side of a composite preform having a ply surface including a plurality of divots. The method may further include at least partially filling at least some of the divots with the resin-wetting control layer. The method may additionally include preventing resin and gases from entering a space in at least some of the divots occupied by a complementary structure of the resin-wetting control layer during curing of the composite preform.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 9 is an exploded side view illustration of a bagging system and the layup of a composite preform onto a resin-wetting control layer integrally formed into a forming surface of a forming tool and further illustrating a resin-wetting control layer incorporated into a caul surface of a caul plate;

FIG. 10 is a side view illustration of the bagging system of FIG. 9 in an assembled state and showing the application of heat and compaction pressure to the composite preform sandwiched between the resin-wetting control layers of the forming tool and the caul plate;

FIG. 11 is a magnified exploded side view illustration of a portion of the caul plate and composite preform taken along line 11 of FIG. 9 and illustrating the resin-wetting control layer configured as a surface texture comprising a plurality of surface features configured as a plurality of nubs formed on a caul surface of the caul plate;

FIG. 12 is a side view illustration of the caul plate and the composite preform taken along line 12 of FIG. 10 and illustrating the nubs filling the divots of the composite ply;

FIG. 13 is a perspective view illustration of a cured composite article manufactured using a resin-wetting control layer incorporated into the caul plate and resulting in the outermost ply being devoid of surface porosity;

FIG. 14 is a plan view of a portion of the cured composite article taken along line 14 of FIG. 13 and illustrating the imprinting of the surface texture on the outermost ply and the resulting lack of surface porosity in the outermost ply;

FIG. 15 is a perspective view illustration of an example of a resin-wetting control layer configured as a compliant layer formed of elastomeric material;

FIG. 16 is a magnified view of a portion of the compliant layer taken along line 16 of FIG. 15 and illustrating a layer thickness along which the compliant layer is compliant in a through-the-thickness direction;

FIG. 17 is an exploded side view illustration of a portion of a caul plate configured as a compliant layer prior to assembly with a composite preform;

FIG. 18 is a side view illustration of the caul plate and composite preform in an assembled state with compaction pressure applied to the caul plate causing localized portions of the compliant layer to fill the volume of the divots of the outermost ply;

DETAILED DESCRIPTION

Figure 1:
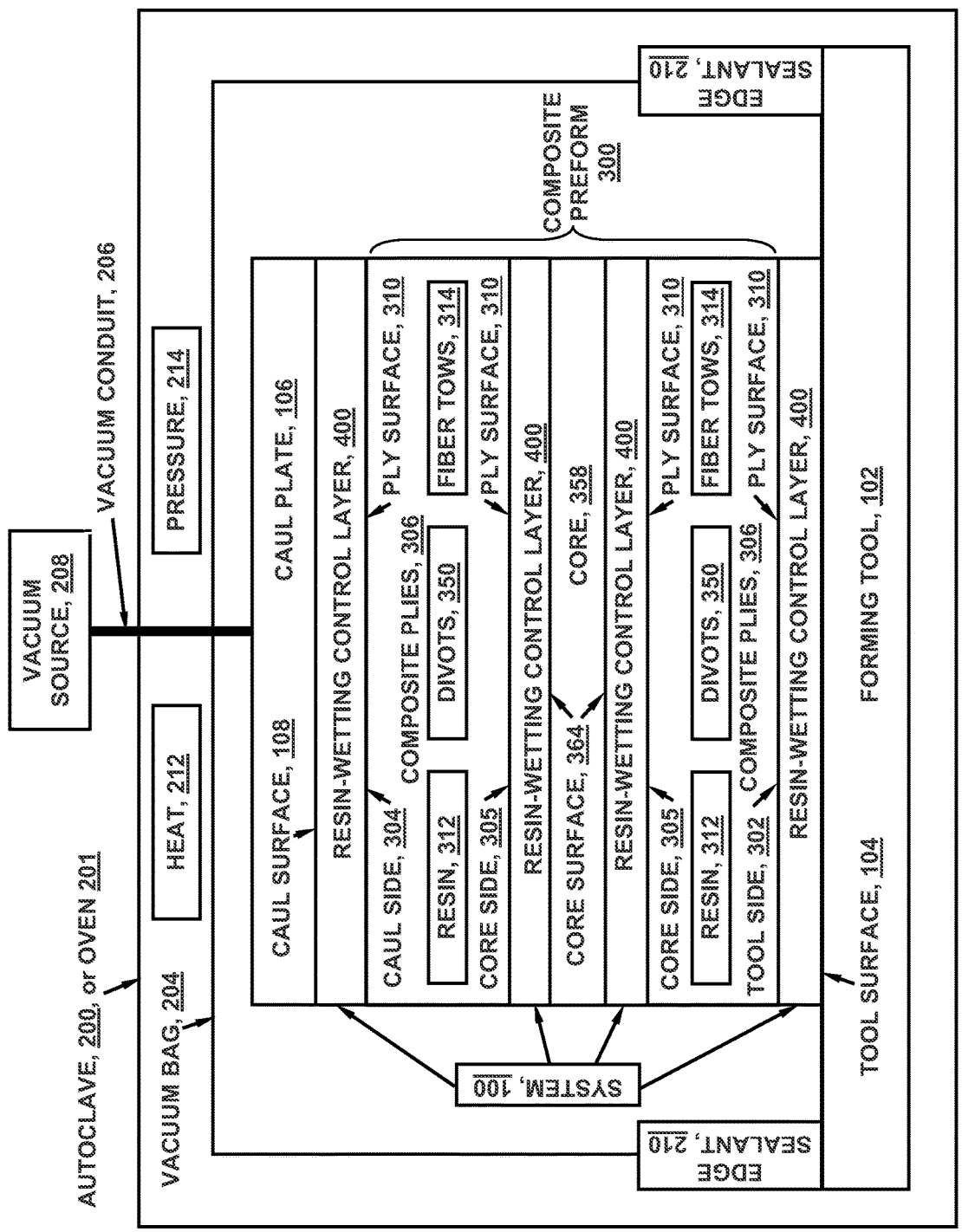
FIG. 1 is an illustration of a functional block diagram of a system that may be implemented for reducing or preventing surface porosity in a cured composite article.
Figure 2:
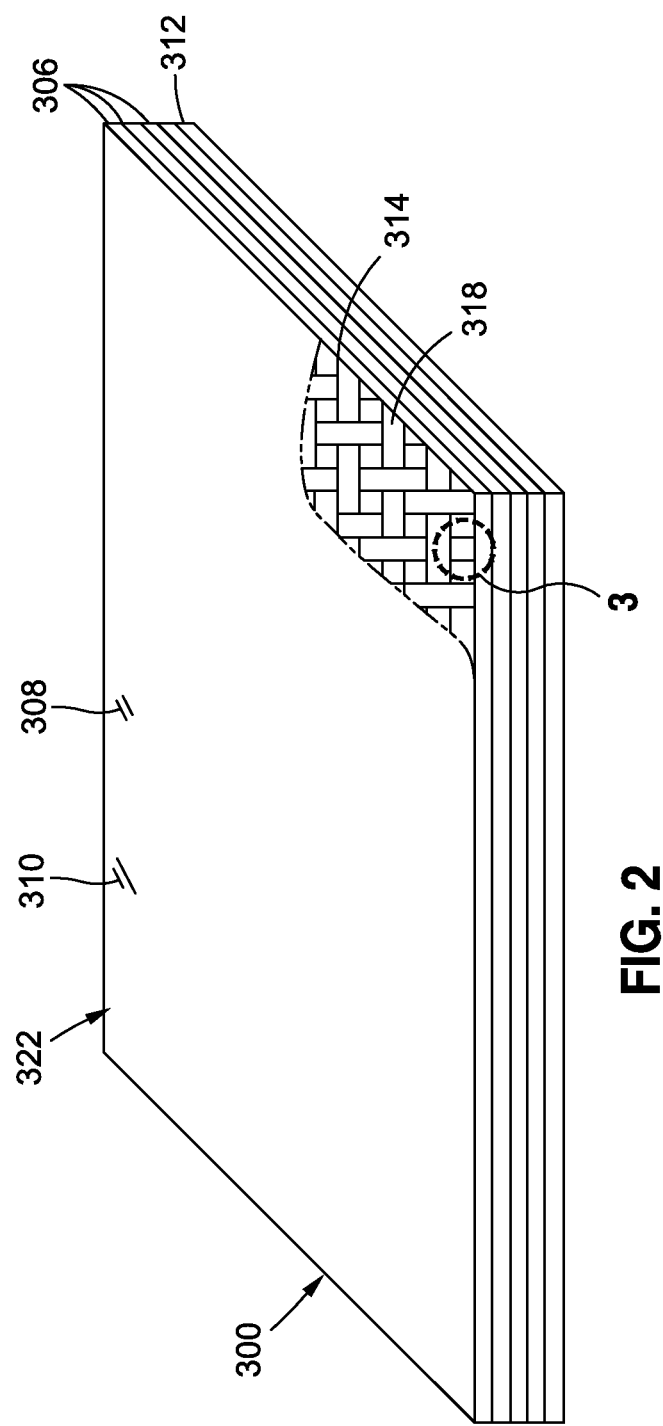
FIG. 2 is a perspective view illustration of an example of a cured composite article having surface porosity in an outermost ply formed of woven fabric.

Referring now to the drawings wherein the showings are for purposes of illustrating various embodiments of the present disclosure, shown in FIG. 1 is an illustration of a functional block diagram of a system 100 that may be implemented during manufacturing of a composite article 322 (FIG. 2). As described in greater detail below, the system 100 may include a resin-wetting control layer 400 that may be placed in contact with one or more composite plies 306 of a composite preform 300. The resin-wetting control layer 400 may be configured complementary to a ply surface 310 of a composite ply 306 for reducing surface porosity (not shown) of the ply surface 310. In one example, the resin-wetting control layer 400 may be associated with a forming tool 102, a caul plate 106, and/or a core 358 of a composite preform 300 during curing of the composite preform 300 to form a cured composite article 322 (FIG. 2) with reduced or non-existent surface porosity. For example, a resin-wetting control layer 400 may be placed in contact with an outermost ply 308 (FIG. 2) on one or both sides of a composite preform 300 and may improve the resin-wetting capability of a forming tool 102 and/or a caul plate 106 relative to the resin-wetting capability of a conventional forming tool (not shown) or conventional caul plate (not shown) lacking a resin-wetting control layer 400. A resin-wetting control layer 400 may also be associated with at least one of opposing core surfaces 364 of a core 358 which may be sandwiched between inner plies 307 (FIG. 19) of a composite preform 300. The resin-wetting control layer 400 may be configured complementary to the ply surface 310 of an inner ply 307 (FIG. 19) on at least one core side 305 of a composite preform 300.

As described in greater detail below, the resin-wetting control layer 400 (FIG. 1) may be configured complementary to the ply surface 310 (FIG. 1) of composite ply 306 such as an outermost ply 308 (FIG. 2) and/or an inner ply 307 (FIG. 19), either or both of which may have a plurality of divots 350 (FIG. 1). When the resin-wetting control layer 400 is mated with the composite ply 306, the resin-wetting control layer 400 may at least partially fill at least some of the divots 350, and may thereby prevent or displace resin 312 (FIG. 1) and gases (not shown) in at least some of the divots 350 during resin infusion and/or during curing of the composite preform 300 which may prevent surface porosity (not shown) in the composite ply 306 of the cured composite article 322 (FIG. 2). In this regard, displacement of the divots 350 with the resin-wetting control layer 400 may prevent resin 312 from filling the divots 350 which may result in an increase in the fiber volume fraction of the cured composite article 322 (FIG. 2) resulting in an improvement in the specific strength and/or stiffness of the cured composite article 322 relative to a composite article (not shown) cured without a resin-wetting control layer 400. In addition, preventing resin 312 from filling the divots 350 may reduce the amount of volatiles (not shown) produced by resin 312 at an interface (not shown) between the outermost plies 308 (FIG. 19) of the composite preform 300 and a forming tool 102 (FIG. 19) and/or a caul plate 106 (FIG. 19), and/or at an interface (not shown) between inner plies 307 (FIG. 19) of the composite preform 300 and a core 358 (FIG. 19) in the composite preform 300. A reduction in volatiles may reduce or prevent trapped gas (not shown) at such interfaces (not shown) which may reduce or prevent surface porosity in the composite preform 300 at the interfaces (not shown).

The resin-wetting control layer 400 (FIG. 1) may also at least partially fill at least some of the divots 350 (FIG. 1) and thereby displace or prevent gases (not shown) such as air that may otherwise be trapped at the interface (not shown) between the composite preform 300 (FIG. 1) and a conventional caul plate (not shown) or conventional forming tool (not shown). However, at least partially filling the divots 350 with surface features 405 (FIGS. 7-8) of a resin-wetting control layer 400 and/or with localized portions 426 (FIG. 18) of a through-the-thickness-compliant resin-wetting control layer 400 (FIG. 1) may displace, prevent and/or avoid the entry of resin 312 and/or gas bubbles (not shown—e.g., trapped air and/or volatiles) into the divots 350. The displacement of gas may increase the resin wettability of the ply surface 310 (FIG. 1) of the composite preform 300 by decreasing the volatiles from resin 312 near the composite preform 300 surface (not shown) in contact with a tool surface 104 of a forming tool 102, a caul surface 108 of a caul plate 106, and/or a core surface 364 (FIG. 1) of a core 358 (FIG. 1). In this regard, the increase in wettability of the ply surface 310 (FIG. 1) of the composite preform 300 may be proportional to the decrease in gases at interfaces (not shown) between the ply surfaces 310 and the resin-wetting control layer 400.

FIG. 1 further illustrates a forming tool 102 having a tool surface 104. As indicated above, a resin-wetting control layer 400 may be associated with a tool surface 104. A plurality of composite plies 306 may be laid up on the resin-wetting control layer 400 of the forming tool 102 to form a composite preform 300. A tool side 302 of the composite preform 300 may be in contact with the resin-wetting control layer 400. In some examples, the composite plies 306 may be prepreg composite plies (not shown) comprised of fiber tows 314 (e.g., reinforcing fibers) pre-impregnated with resin 312 (e.g., thermoplastic resin or thermosetting resin) in a partially-cured state. However, in other examples, the composite preform 300 may be formed of one or more layers of dry fiber preform (not shown) which may be infused with resin 312 in a wet layup process and cured. As indicated above, in some examples, the composite preform 300 may include a core 358 which may be formed of a relatively low-density material (not shown) to increase the bending stiffness of the cured composite article 322 (FIG. 2).

FIG. 1 further illustrates a caul plate 106 that may be applied over the composite preform 300. The caul plate 106 may include a caul surface 108 configured to be placed in contact with a caul side 304 of the composite preform 300. The caul surface 108 may include or may comprise a resin-wetting control layer 400 for improving the resin-wetting capability of the caul plate 106. In still further examples, the composite preform 300 may include a core 358 sandwiched between inner plies 307 (FIG. 19) of the composite preform 300. The core 358 may include opposing core surfaces 364 (FIG. 1). A resin-wetting control layer 400 may be associated with at least one of the opposing core surfaces 364 of the core 358 to at least partially fill the divots 350 that may exist on the ply surface 310 (FIG. 1) of the inner plies 307 (FIG. 19) that interface with the core 358 and thereby prevent or displace resin 312 and/or gases (not shown) such as volatiles that may be produced by the resin 312 near the ply surface 310 (FIG. 19) at the interface (not shown) with the core 358. In this regard, a resin-wetting control layer 400 associated with one or both of the core surfaces 364 may improve the resin-wetting capability of the core 358 to reduce or prevent the occurrence of surface porosity (not shown) in the inner plies 307 that interface with the core 358, and may additionally increase the fiber volume fraction of the cured composite article 322 (FIG. 2) resulting in an increase in the specific strength and/or stiffness of the cured composite article 322, as mentioned above.

In some examples, the forming tool 102, composite preform 300, and caul plate 106 may be positioned as an assembly inside of an autoclave 200 or oven 201 for curing the composite preform 300. A vacuum bag 204 may seal the composite preform 300 to the forming tool 102 using edge sealant 210. A vacuum source 208 may be fluidly coupled to the vacuum bag 204 using a vacuum conduit 206 to apply a vacuum (not shown) to the vacuum bag 204 to facilitate the application of compaction pressure 214 on the composite preform 300 during consolidation and/or curing of the composite preform 300. Heat 212 may also be applied to reduce resin 312 viscosity to promote resin 312 flow under the compaction pressure 214 and/or to initiate and/or facilitate the curing of the resin 312 at an elevated temperature.

FIG. 2 is a perspective view illustration of an example of a cured composite article 322 having surface porosity (not shown) in an outermost ply 308 of the composite preform 300 as a result of curing the composite preform 300 using a conventional forming tool (not shown) and/or conventional caul plate (not shown). The cured composite article 322 may be formed as a layup of composite plies 306. The composite plies 306 may be prepreg composite plies (not shown) formed of woven fabric 318. The woven fabric 318 may be a cross-ply weave (not shown) of fiber tows 314 in a bi-directional fiber arrangement (not shown). Surface porosity (not shown) may occur on the ply surface 310 of an outermost ply 308 at intersections of the crossing fiber tows 314. The surface porosity may detract from the appearance and/or the aesthetics of the surface finish (not shown) of the cured composite article 322.

Figure 3:
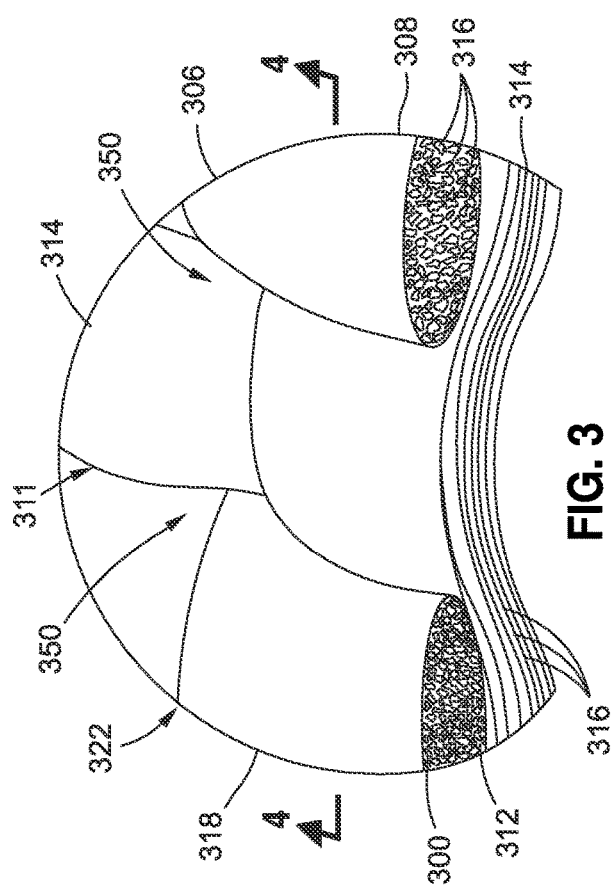
FIG. 3 is a perspective side view of a portion of the cured composite article of FIG. 2 and illustrating surface porosity in the divots at the intersections of the fiber tows of the woven fabric.

FIG. 3 is a perspective view of a portion of the cured composite article 322 of FIG. 2 and illustrating divots 350 (e.g., depressions) formed at the intersections of the fiber tows 314 of the woven fabric 318. Each one of the fiber tows 314 may be formed as bundles of unidirectional filaments 316 and which may be impregnated or infused with resin 312. The divots 350 may occur due to undulations in the fiber tows 314 as they cross one another in the woven fabric 318. A divot 350 may extend along an edge of an overlap of one fiber tow 314 of a composite ply 306 crossing over another fiber tow 314 of the same composite ply 306. Divots 350 may also be formed at the intersection of two pairs of adjacent fiber tows 314 in the same composite ply 306. In addition, divots 350 may be defined by gaps (not shown) between adjacent composite plies 306 that result in relatively small through-holes (not shown) in the woven fabric 318 when viewed in plan view. As may be appreciated, the shape of the divots 350 in a composite ply 306 may be defined by the type of weave, the geometry of the fiber tows 314, the existence of any gaps (not shown) between adjacent parallel fiber tows 314 of the same composite ply 306, and other parameters.

Figure 4:
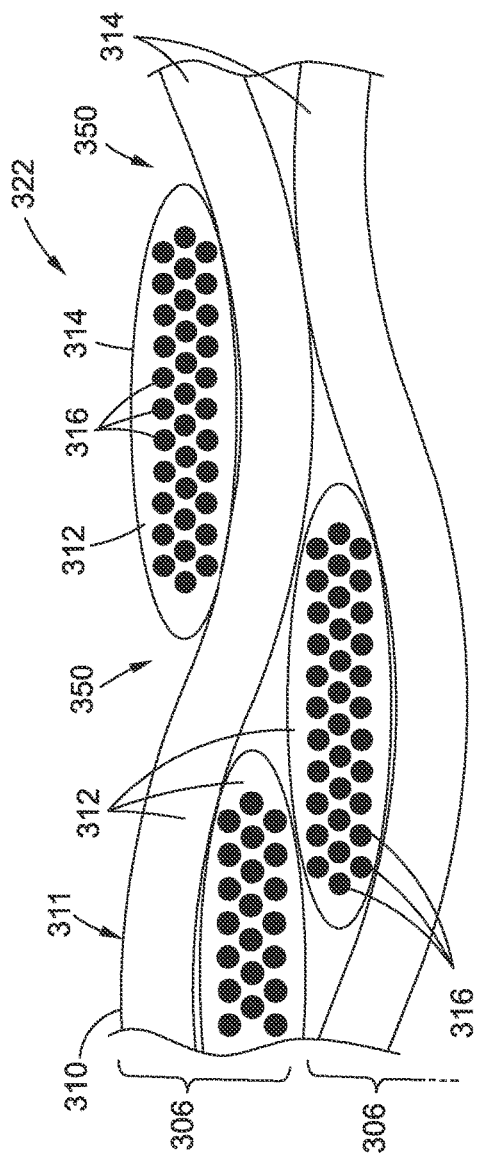
FIG. 4 is a sectional view of a portion of the cured composite article taken along line 4 of FIG. 3 and illustrating surface porosity in the ply surface of the outermost ply.

FIG. 4 is a sectional view of a portion of the cured composite article 322 of FIG. 3 and further illustrating the divots 350 formed at the intersections of the fiber tows 314. The divots 350 may represent locations where surface porosity (not shown) may occur. Surface porosity may be described as surface pitting (not shown), cavities (not shown), pin holes (not shown), and/or small craters (not shown) in the ply surface 310 of the cured composite article 322. As indicated above, surface porosity may occur as a result of non-uniform wetting of one or more portions of a ply surface 310 of a composite preform 300. As mentioned above, such non-uniform wetting may occur in conjunction with the use of conventional forming tools (not shown) and/or conventional caul plates (not shown) which may have a generally smooth surface (not shown) and which may be treated with a release coating (not shown) to prevent bonding to the composite preform so that the cured composite article 322 may be removed from the forming tool 102 after cure. Such release coating may locally inhibit resin coverage and/or may repel resin flow into localized areas (not shown) on the ply surface 310 of a composite preform 300 and may result in surface porosity.

In FIG. 4, in some examples, surface porosity (not shown) may be the result of the lack of resin 312 flow into the divots 350 or the lack of resin 312 coverage over certain portions of the fiber tows 314. However, in the present disclosure, surface porosity may occur at any location on a ply surface 310 of a composite preform 300, and is not limited to divots 350 in a woven fabric 318 (FIG. 3) composite ply 306. In this regard, non-uniform wetting (not shown) may be described as the lack of resin 312 and/or non-uniform resin coverage at any location along a ply surface 310 of a composite preform 300, and is not limited to lack of resin flow into the divots 350 or lack of resin coverage at the divots 350 in a woven fabric 318 composite ply 306.

Advantageously, the resin-wetting control layer 400 (FIG. 1) of the present disclosure promotes uniform wetting of the ply surface 310 of a composite preform 300 (FIG. 1) to reduce or prevent the occurrence of surface porosity (not shown) in the cured composite article 322 (FIG. 2). As mentioned above and described in greater detail below, a resin-wetting control layer 400 (FIG. 1) may be associated with a tool surface 104 (FIG. 1) of a forming tool 102 (FIG. 1), a caul surface 108 (FIG. 1) of a caul plate 106 (FIG. 1), and/or a core surface 364 of a core 358, and may promote uniform resin 312 (FIG. 1) coverage of the ply surface 310 (FIG. 1) of a composite preform 300 (FIG. 1) during cure without the occurrence of surface porosity such as surface pitting (not shown), cavities (not shown), pin holes (not shown), and/or craters (not shown) in the resin 312 (FIG. 1) on the ply surface 310 (FIG. 1) of outermost plies 308 and/or inner plies 307 (FIG. 1) of a cured composite article 322 (FIG. 2). In some examples, the resin-wetting control layer 400 (FIG. 1) may be provided as a surface texture 404 (FIGS. 7-8 and 12-13). In other examples, the resin-wetting control layer 400 (FIG. 1) may be provided as a compliant layer 420 (FIGS. 15-18) having compliance in the through-the-thickness direction 422 (FIG. 16). In still other examples, the resin-wetting control layer 400 may be provided as a combination of a surface texture 404 and a compliant layer 420.

Figure 5:
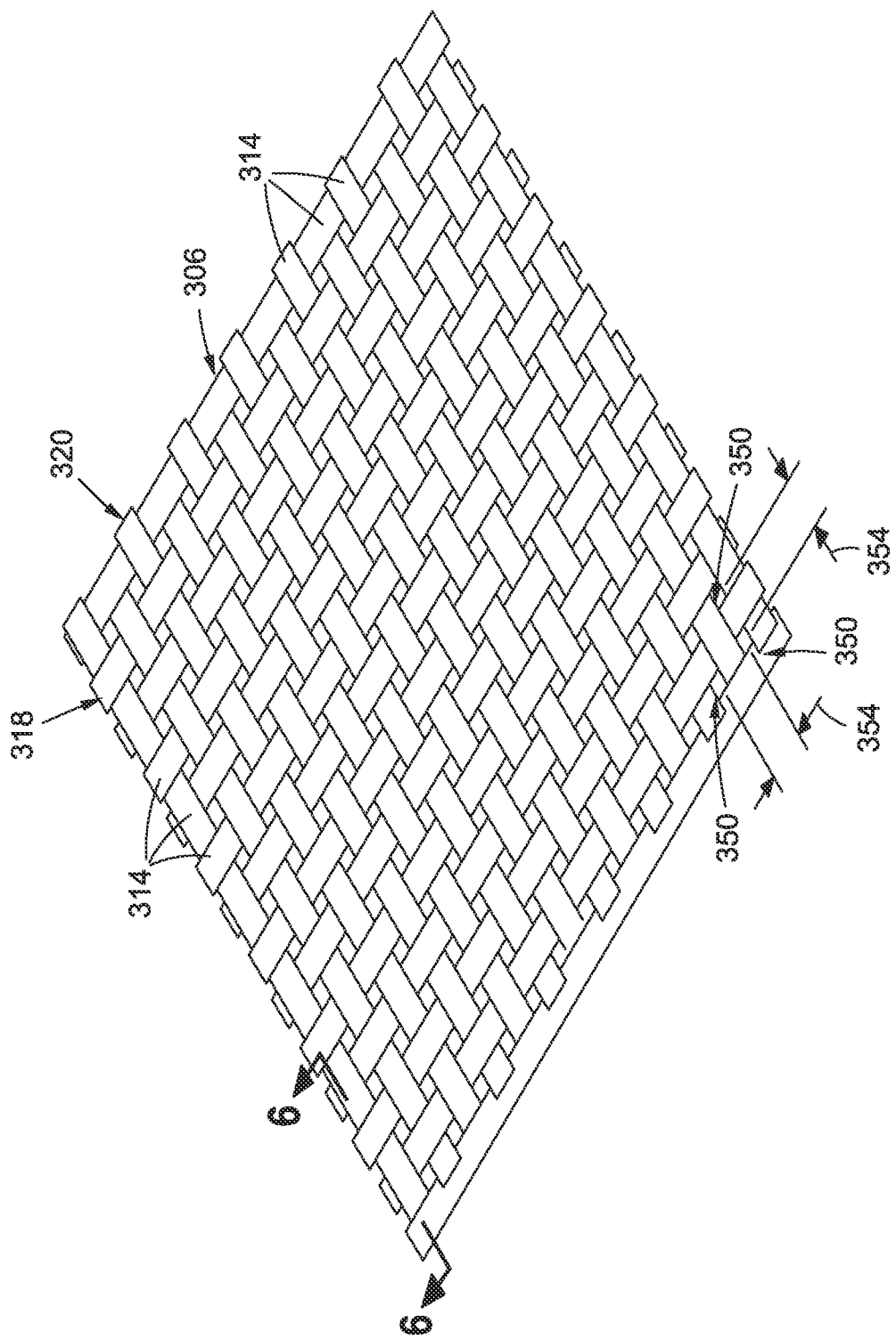
FIG. 5 is a perspective view illustration of an example of composite ply formed of woven fabric.

FIG. 5 is a perspective view illustration of an example of a computer model 320 of a single composite ply 306 of woven fabric 318 which may be used for determining a configuration of a surface texture 404 (FIGS. 7-8) of a resin-wetting control layer 400 (FIGS. 7-8) that may be placed in contact with or mated to a layup of composite plies 306. The woven fabric 318 may include a plurality of divots 350 at intersections of the fiber tows 314 in the woven fabric 318. The divots 350 may have a divot geometry (not shown) and may be spaced apart from one another at a divot spacing 354 dictated by the arrangement of the fiber tows 314 that make up the woven fabric 318. The surface texture 404 (FIGS. 7-8) for a resin-wetting control layer 400 may include a plurality of surface features 405 (FIGS. 7-8) formed complementary to the contour (not shown) and/or texture (not shown) of a composite ply 308. In one example, surface features 405 (FIGS. 7-8) may be configured as nubs 406 (FIGS. 7-8) having a nub 406 geometry (FIG. 8) and a nub spacing 412 (FIG. 7) that is complementary to the divot geometry (not shown) and divot spacing 354 as may be determined from analysis of a computer model 320 of the composite ply 306. However, in other examples, the surface texture 404 for a resin-wetting control layer 400 may be determined by taking measurements of the divot geometry and divot spacing 354 of an actual composite ply 306.

In FIG. 5, the composite ply 306 is a woven fabric 318 in a plain weave (not shown) of fiber tows 314 in a bi-directional fiber arrangement. However, the composite ply 306 may be provided in any one of a variety of alternative woven configurations, and is not limited to a plain weave. For example, the woven fabric 318 may be provided in a twill weave (not shown), a satin weave (not shown), or other bi-directional fiber arrangements (not shown). In still further examples, a woven fabric 318 may be provided in multi-directional fiber orientations (not shown) including three (e.g., a triaxial weave—not shown) or more different fiber orientations for the fiber tows 314 in the woven fabric 318. Even further, a composite ply 306 may have a unidirectional fiber orientation (e.g., unidirectional tape or unidirectional sheet—not shown) which may be analyzed or measured to facilitate the determination of a configuration of a surface texture 404 (FIGS. 7-8) of a resin-wetting control layer 400 that may be placed in contact with the unidirectional composite ply (not shown) to promote uniform wetting of the ply surface 310 of such unidirectional composite ply. In this regard, a surface texture 404 of a resin-wetting control layer 400 (FIGS. 7-8) may include any size, spacing, shape, and configuration of surface features 405 (FIG. 8) such as bumps (not shown), ridges (not shown), grooves (not shown), or other shapes of surface features 405 configured complementary to the texture (not shown) of a ply surface 310 of a composite preform 300 to promote uniform wetting of the ply surface 310 of the composite preform 300 to reduce or prevent surface porosity (not shown).

Figure 6:
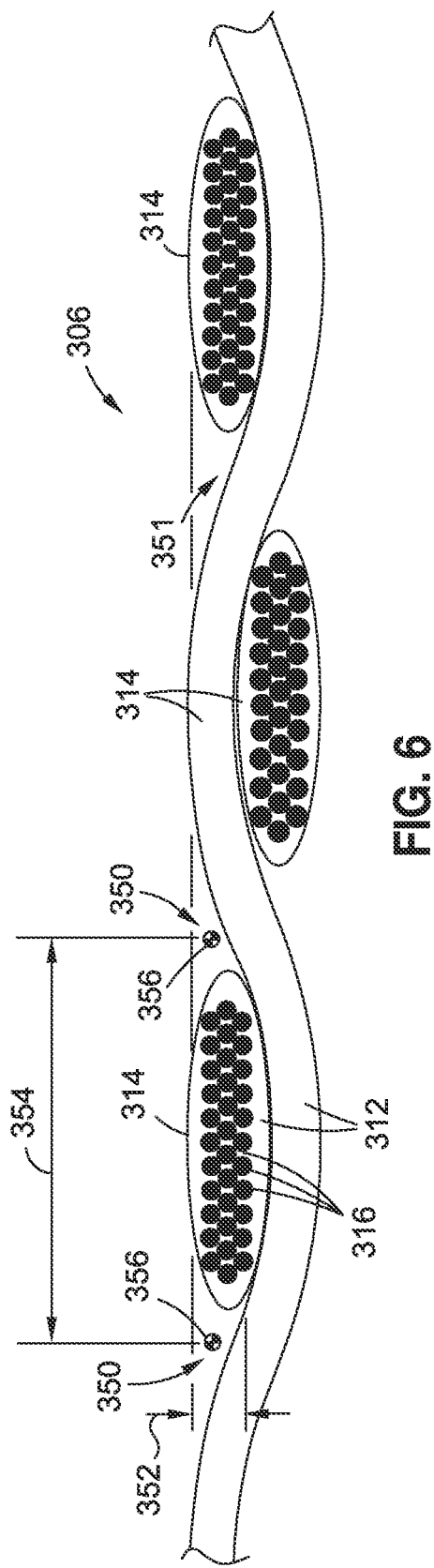
FIG. 6 is a sectional view of a portion of the composite ply taken along line 6 of FIG. 5 and illustrating a divot spacing and a divot depth of the divots of the composite ply.

FIG. 6 is a sectional view of a portion of the composite ply 306 of FIG. 5 and illustrating an example of divot spacing 354 between the divots 350 formed at the intersection of fiber tows 314 of a single composite ply 306 of woven fabric 318 (FIG. 5). In the example shown, the divot spacing 354 may be defined as the distance between the geometric centers 356 (e.g., the area centroid) of the adjacent divots 350. In some examples, the divot spacing 354 may be generally uniform along two or more directions of the composite ply 306. For example, the divot spacing 354 may be uniform along a length (not shown) and/or uniform along a width (not shown) of the composite ply 306. However, in other examples not shown, the divot spacing 354 may be non-uniform along the length (not shown) and/or non-uniform along the width (not shown).

In addition, in FIG. 6, depending on the type of weave (not shown) of the composite ply 306, the divot spacing 354 along one direction of a composite ply 306 may be different than the divot spacing 354 along another direction of the composite ply 306. For example, the divot spacing 354 along the length (not shown) of a composite ply 306 may be different than the divot spacing 354 along the width (not shown). In FIG. 6, the divots 350 may have a divot depth 352 which may be measured along a direction normal to an in-plane direction of the composite ply 306. The divot depth 352 may extend from an uppermost surface (not shown) of the fiber tows 314 to a lowermost portion (not shown) of a divot 350.

Figure 7:
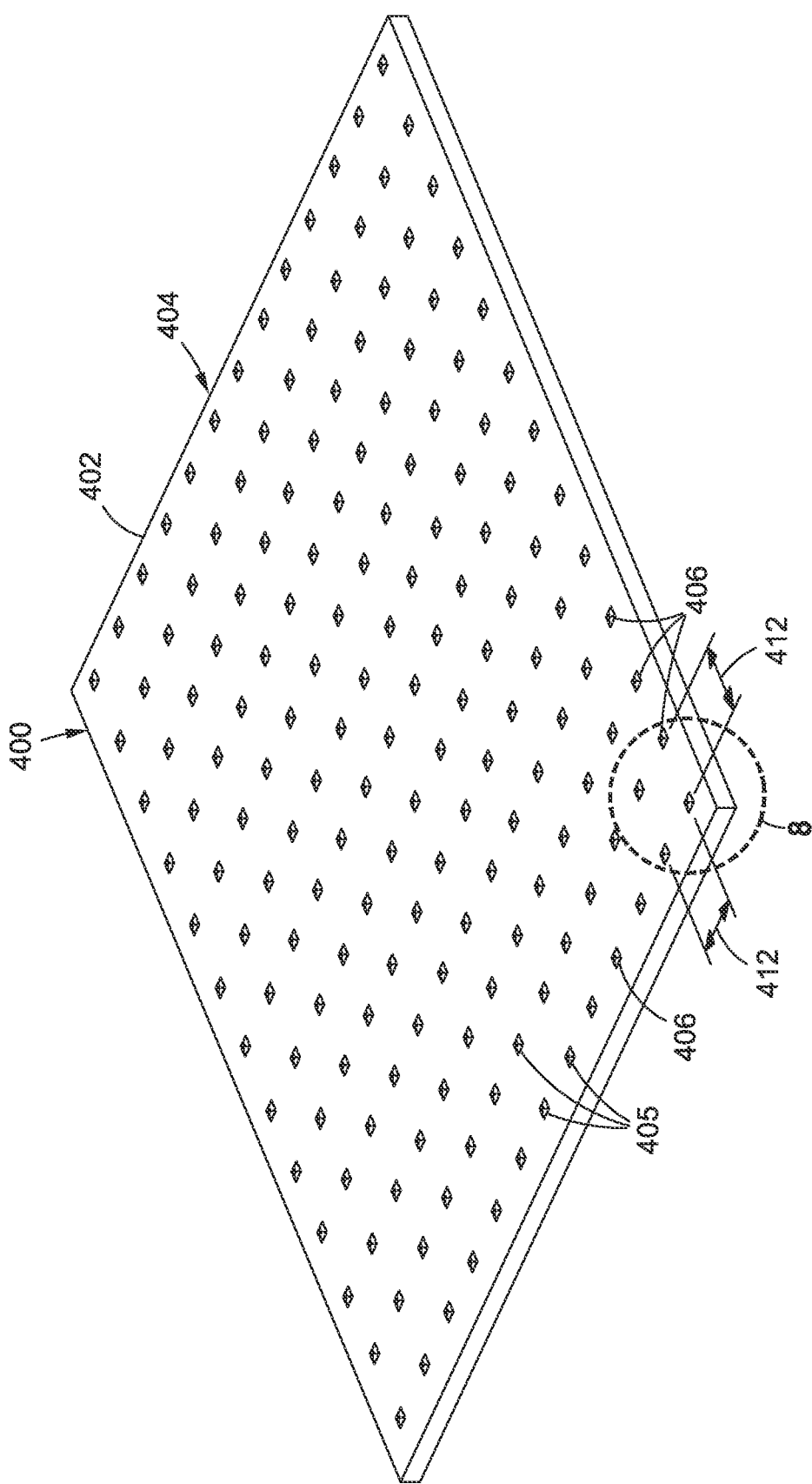
FIG. 7 is a perspective view illustration of an example of a resin-wetting control layer formed as a panel and including a surface texture comprising a plurality of surface features configured as nubs sized and shaped complementary to the size and shape of the divots in the woven fabric composite ply of FIG. 6.

FIG. 7 is a perspective view illustration of an example of a resin-wetting control layer 400 having a surface texture 404 formed complementary to a texture (not shown) of the composite ply 306 of FIG. 5. The resin-wetting control layer 400 may be integral with a forming tool 102 and/or the resin-wetting control layer 400 may be integral with a caul plate 106. Alternatively, the resin-wetting control layer 400 may be separately formed as a panel 402 which may be assembled with a forming tool 102 and/or assembled with a caul plate 106 (FIG. 1). In the example shown, the surface texture 404 may comprise a plurality of surface features 405 configured as nubs 406 configured to be complementary to the texture (not shown) of the ply surface 310 (FIG. 1) of a composite ply 306. The size, shape, and spacing of the plurality of surface features 405 may be based on measurements of a composite ply 306. As indicated above, a computer model 320 (FIG. 5) of the composite ply 306 may be analyzed or an actual composite ply 306 may be measured to determine the size, shape, and spacing of the surface features 405.

In the example of a woven fabric 318 (FIG. 5) composite ply 306 (FIG. 5), analysis or measurement of the composite ply 306 may be used to determine a nub spacing 412 (FIG. 7) and a nub 406 geometry (not shown—e.g., nub size and nub shape) required to at least partially fill at least some of the divots 350 when the resin-wetting control layer 400 is placed in contact with the ply surface 310 (FIG. 3) of the composite ply 306. A pattern of nubs 406 (FIG. 7) may be configured complementary to a pattern (not shown) of divots 350 in a woven fabric 318 such as the woven fabric 318 composite ply 306 of FIG. 5. In one example, each one of the nubs 406 may be sized and configured to fill or displace up to 100% of the space 351 (FIG. 6) or volume of a corresponding divot 350 when the resin-wetting control layer 400 is placed in contact with the composite ply 306. Filling or displacing up to 100% of the volume of the divots 350 in a composite ply 306 may reduce the total amount of resin in a composite preform and may thereby increase the fiber volume fraction (not shown) of the cured composite article 322 which may increase the specific strength and/or specific stiffness of the cured composite article 322 (FIG. 2). In this regard, the presently-disclosed resin-wetting control layer 400 may represent a means for increasing a fiber volume fraction (not shown) of a cured composite article 322 relative to the fiber volume fraction achievable using conventional tooling (not shown) or conventional cores (not shown) that lacks a resin-wetting control layer 400.

Referring to FIG. 7, in some examples of a resin-wetting control layer 400, the nubs 406 may be sized and configured to fill or displace less than 100% of the space 351 (FIG. 6) or volume of the divots 350 (FIG. 6) which may reduce the fiber volume fraction (not shown) of the cured composite article 322 (FIG. 2) but which may also relax (e.g., increase) the manufacturing tolerances for forming the nubs 406 (FIG. 7) and/or may relax the manufacturing tolerances (e.g., the accuracy) with which the nubs 406 (FIG. 11) may be aligned with the divots 350 (FIG. 11) when a resin-wetting control layer 400 (FIG. 12) is placed in contact with a composite ply 306 (FIG. 11) of a composite preform 300. In one example, the nubs 406 may be sized and configured to fill up to 70% of the volume of the divots 350. In still further examples, the nubs 406 may be sized and configured to fill up to 50% of the volume of the divots 350.

Figure 8:
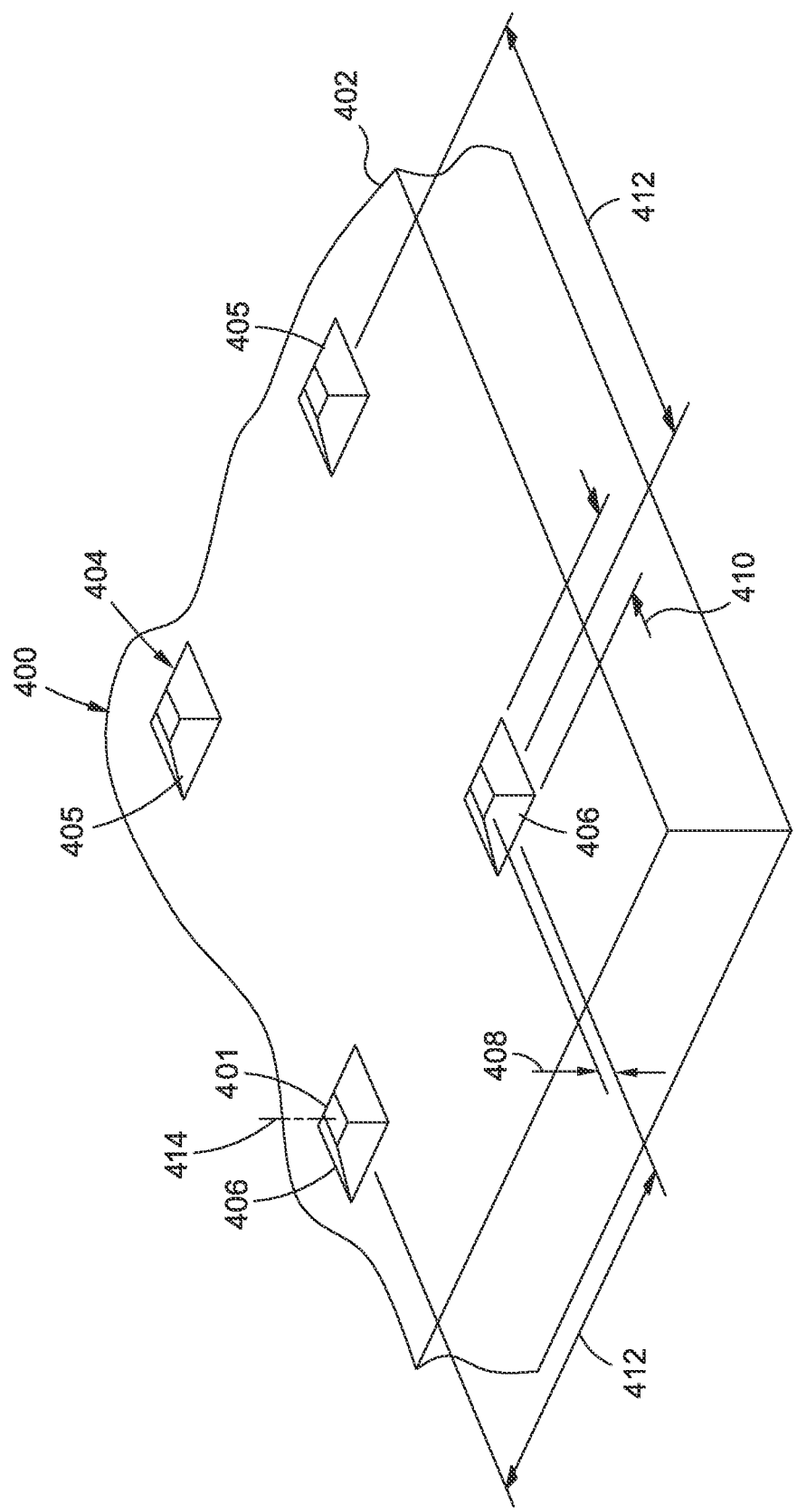
FIG. 8 is a magnified view of a portion of a resin-wetting control layer taken along line 8 of FIG. 7 and illustrating an example of nub geometry and nub spacing.

FIG. 8 is a magnified view of a portion of a resin-wetting control layer 400 of FIG. 7 and illustrating an example of nub geometry (not shown) and nub spacing 412 configured complementary to a divot geometry (not shown) and divot spacing 354 (FIG. 5) of divots 350 in a composite ply 306 (FIG. 5). The nubs 406 may each have a nub height 408, a nub base width 410, and a nub spacing 412 configured complementary to the divot depth 352 (FIG. 6) and divot size (not shown) and divot spacing 354.

In the example shown in FIGS. 7-8, a resin-wetting control layer 400 was fabricated as a panel 402 having a nub spacing 412 based on a woven fabric 318 (FIG. 5) which was analyzed to have a divot spacing 354 (FIG. 5) of approximately 0.087 inch (e.g., ±0.005) along a lengthwise direction (not shown) and along a widthwise direction (not shown). Analysis of the volume (not shown) and shape (not shown) of the divots 350 (FIG. 5) in the woven fabric 318 dictated the truncated, pyramidal shape of the nubs 406 resulting in an approximate trapezoidal cross section (not shown) with concave sides (not shown) wherein each nub 406 had a nub height 408 of approximately 0.004 inch (e.g., ±0.001) and a nub base width 410 of approximately 0.039 inch (e.g., ±0.003). Although the nubs 406 in FIG. 8 are shown as being symmetrical about a central vertical axis 414 (FIG. 8) or vertical plane (not shown) along both a lengthwise direction (not shown) and a widthwise direction (not shown) of each nub 406, the nubs 406 may be provided in any one of a variety shapes (not shown) which may be non-symmetrical along one or more directions. In some examples, a resin-wetting control layer 400 may include nubs 406 that are non-symmetrical (not shown) about the lengthwise direction (not shown) and/or non-symmetrical about the widthwise direction to facilitate resin infusion at an interface (not shown) between the resin-wetting control layer 400 and the composite preform 300. In this regard, a non-symmetrical nub shape may result in a larger gap (not shown) between the nub surface and the ply surface on at least one side of the nub 406 and which may allow for resin flow through such gap and into the space between the nub and the ply surface (e.g., at a divot 350) to ensure resin wetting of the ply surface at the divot 350.

As may be appreciated, the configuration of the surface texture 404 (FIG. 8) of a resin-wetting control layer 400 (e.g., the geometry, size, and spacing of the surface features 405) may be dictated by the configuration of a composite ply 306 (FIG. 5) to be placed in contact with the resin-wetting control layer 400 (FIG. 8). Parameters of the composite ply 306 (FIG. 5) that may dictate the configuration of the surface features 405 (FIG. 8) include fiber width (not shown), fiber thickness (not shown), fiber cross-sectional shape (not shown), fiber spacing (not shown), and the type of composite ply 306 (e.g. unidirectional, woven, etc.).

For woven fabric 318 (FIG. 5), the type of weave (e.g., plain, satin, etc.—not shown) may dictate the spacing of the surface features 405 (FIGS. 7-8). Other parameters (not shown) associated with the fiber tows 314 (FIG. 5) that make up a composite ply 306 (FIG. 5) may influence the configuration of the surface features 405 of a resin-wetting control layer 400 (FIGS. 7-8). In one example, a surface texture 404 (FIG. 7) of a resin-wetting control layer 400 may include surface features 405 having a surface feature spacing (not shown) in the range of approximately 0.020-0.100 inch, and a surface feature depth (not shown) of up to approximately 0.020 inch. However, a surface texture 404 may include surface features 405 with a surface feature spacing (not shown) of less than 0.020 or greater than 0.100 inch, and a surface feature depth (not shown) of greater than 0.020 inch In examples where the resin-wetting control layer 400 (FIG. 8) is formed as a panel 402 (FIG. 8) separate from the forming tool 102 (FIG. 1), caul plate 106 (FIG. 1), or core 358 (FIG. 1), the panel 402 may be formed in a thickness (not shown) allowing for the manufacturing (e.g., machining) and handling of the panel 402. In the example of FIG. 8, the panel 402 may be machined from a relatively stiff material such as metallic material such as steel, aluminum, Invar™, or other alloy. Alternatively, the panel 402 may be formed of ceramic material, composite material (e.g., carbon fiber reinforced polymer matrix material), or other types of material. In some examples, a panel 402 may be formed of material having a relatively high out-of-plane stiffness (e.g., bending stiffness).

In one example, a panel 402 (FIG. 7-8) may be formed of an aluminum plate (not shown) with the surface texture 404 (FIG. 8) machined into at least one side of the aluminum plate. In a non-limiting example, the aluminum plate may be provided in a thickness of approximately 0.12 inch although other thicknesses are possible. In this regard, a panel 402 may be provided in any thickness that provides durability for the panel 402 over multiple cure cycles to allow production of multiple copies of a cured composite article (FIG. 2). However, in other examples, the resin-wetting control layer 400 may be formed as a panel 402 that is relatively flexible or bendable in an out-of-plane direction to enable the caul plate 106 to conform to the contour (not shown) of a composite preform 300 (FIG. 19) such as conforming to the global curvature (not shown) and/or bends (not shown) in a contoured (FIG. 19) ply surface 310 (FIG. 19) of a composite preform 300.

In any one of the embodiments disclosed herein, the resin-wetting control layer 400 may be formed of material which is temperature-compatible with the processing temperatures associated with manufacturing a cured composite article 322 (FIG. 2). For example, the resin-wetting control layer 400 (FIG. 8) may be formed of a material that is compatible with relatively high curing temperatures. In one embodiment, the resin-wetting control layer 400 may be formed of a material that is mechanically stable at temperatures of up to 650° F. for curing composite compositions such as bismaleimide having a cure temperature of up to 475° F. In other examples, the resin-wetting control layer 400 (FIG. 8) may be formed of a material compatible for curing epoxy resin 312 (FIG. 4) at temperatures of up to 250° F. In addition, the material for the resin-wetting control layer 400 preferably has a coefficient of thermal expansion (CTE) that is compatible with the CTE of the composite preform 300 (FIG. 3). Furthermore, the material preferably has a relatively high level of durability to maintain the structural integrity and geometry of the resin-wetting control layer 400 with reduced or negligible warpage after multiple cure cycles. The material may also preferably be chemically-compatible with the composite preform 300 and may be chemically non-reactive with the resin 312 of the composite preform 300, as described in greater detail below.

FIG. 9 is an exploded side view illustration of a bagging system 202 and including a composite preform 300 that may be laid up on a forming tool 102. A caul plate 106 may be positioned over the composite preform 300. In the example shown, a resin-wetting control layer 400 may be integral with the tool surface 104 of the forming tool 102. The caul plate 106 may also include a caul surface 108 which may have a resin-wetting control layer 400 that may be integrally formed with the caul plate 106. Each resin-wetting control layer 400 may include a surface texture 404 having a plurality of surface features 405. The surface features 405 may be provided as a plurality of nubs 406 (FIG. 8) that may be machined, cast, molded, or otherwise integrally formed on the tool surface 104 of the forming tool 102 and/or the caul surface 108 of the caul plate 106.

Referring still to FIG. 9, in some examples, a resin-wetting control layer 400 panel 402 may be fixedly attached to the tool surface 104 and/or caul surface 108 such as by adhesive bonding and/or by mechanical fastening. However, in other examples, a resin-wetting control layer 400 may be formed as a separate component such as a panel 402 which may be positioned on a forming tool 102 prior to layup of a composite preform 300 over the panel 402. Following layup of the composite preform 300 on the panel 402, a caul plate 106 having a resin-wetting control layer 400 may be positioned on the composite preform 300. Alternatively, a panel (not shown) having a resin-wetting control layer 400 may be applied over the composite preform 300 after which the caul plate 106 may be applied over the panel 402. In some examples, the resin-wetting control layer 400 may be omitted from either the forming tool 102 or the caul plate 106. In other examples, a panel 402 may be placed on the composite preform 300 and the caul plate 106 may be omitted such that the vacuum bag 204 is applied directly over the panel 402. In still further examples not shown, the panel 402 and the caul plate 106 may be omitted from the top of the composite preform 300 and a vacuum bag 204 may be applied directly over the composite preform 300.

FIG. 10 is a side view illustration of the bagging system 202 of FIG. 9 in an assembled state. The composite preform 300 may be sandwiched between the tool surface 104 of a forming tool 102 and the caul surface 108 of a caul plate 106, each of which may include a resin-wetting control layer 400 such as a surface texture 404 in contact with the composite preform 300. As indicated above, the surface texture 404 may improve the resin-wetting capability and thereby reduce or prevent surface porosity (not shown) in the tool side 302 and/or in the caul side 304 of the composite preform 300 relative to surface porosity that may occur in a composite preform (not shown) cured without a resin-wetting control layer 400 on the tool side 302 and the caul side 304. Heat and/or compaction pressure 214 may be applied to the composite preform 300. The process of curing a composite preform 300 may include the application of heat 212 to reduce the viscosity of the resin 312 (FIG. 4) and/or to initiate or facilitate curing of the resin 312 in the composite preform 300.

FIG. 11 is a magnified exploded side view illustration of a portion of the caul plate 106 and composite preform 300 of FIG. 9 and illustrating a surface texture 404 formed on one side of the caul plate 106. In the example shown, the surface texture 404 comprises a plurality of surface features 405 configure as nubs 406 which may be sized and configured to fill or displace the space 351 (FIG. 6) or volume of the divots 350 in the ply surface 310 of the composite preform 300, as mentioned above. The nubs 406 may be formed at a nub spacing 412 (FIG. 8) that is substantially equivalent to the divot spacing 354 (FIG. 6) in the composite preform 300.

Figure 19:
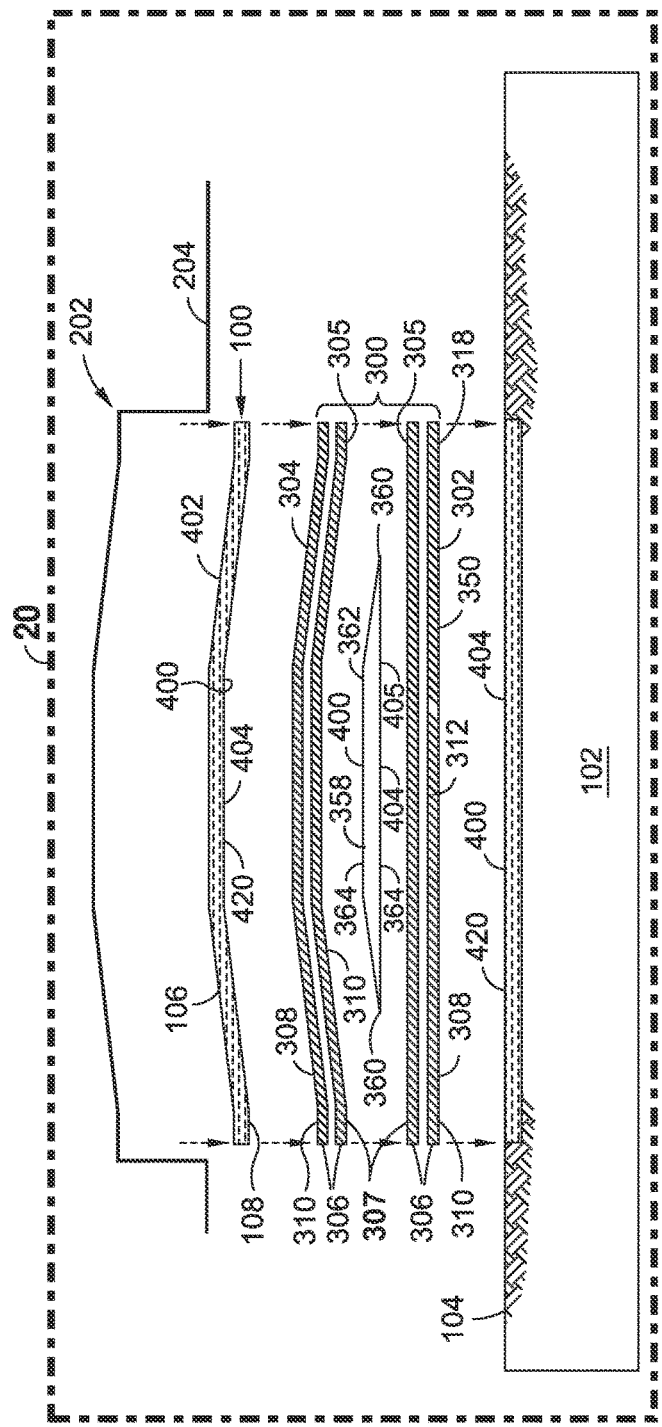
FIG. 19 is an exploded side view illustration of a bagging system for curing a composite preform having an internal core including a resin-wetting control layer on opposing core surfaces and using a forming tool and a caul plate each having a resin-wetting control layer on a respective tool surface and caul surface and wherein the caul plate is contoured complementary to a contour of the ply surface of the composite preform.

Referring still to FIG. 11, in some examples, the nubs 406 (e.g., surface features 405) may be sized and configured to displace at least a portion of the space 351 (FIG. 6) or volume of the divots 350 and may thereby assist in preventing or displacing resin 312 that may otherwise fill the divots 350 at the interface (not shown) between the ply surface 310 of the composite preform 300 and a conventional caul plate (not shown) or conventional forming tool (not shown). Displacement or prevention of resin 312 in the divots 350 by filling the divots 350 with the nubs 406 may advantageously result in a higher fiber volume fraction of the cured composite article 322 (FIG. 2) which may improve the specific strength and stiffness of the cured composite article 322. In addition, the nubs 406 may displace at least a portion of the space 351 (FIG. 6) or volume of the divots 350 and may thereby assist in preventing or displacing gases (not shown) such as air and volatiles that may otherwise be trapped in the divots 350 at the interface (not shown) between the ply surface 310 of the composite preform 300 and a conventional caul plate (not shown) or conventional forming tool (not shown). Displacement or prevention of resin 312 in the divots 350 may also reduce the total amount of volatiles (not shown) produced by the resin 312 and which may otherwise become trapped in the divots 350 near the composite preform 300 surface (not shown) in contact with the tool surface 104, caul surface 108, and/or one or both core surface 364 (FIG. 19). In this regard, at least partially filling the divots 350 with the surface features 405 (e.g., nubs 406) and/or with localized portions 426 (FIG. 18) of a through-the-thickness compliant layer 420 (FIG. 18) may increase the wettability of the composite preform 300 as a result of a decrease in volatiles (not shown) in the resin 312 near the composite preform 300 surface (not shown) in contact with the tool surface 104, caul surface 108, and/or core surface 364 (FIG. 19). The increase in wettability of the composite preform 300 may be proportional to the decrease in gases (e.g., trapped air and/or volatiles) at such interfaces (not shown) between the composite preform 300 and the tool surface 104, caul surface 108, and/or core surface 364 (FIG. 19).

FIG. 12 shows the caul plate 106 placed in contact with the composite preform 300 and illustrating the nubs 406 filling the divots 350 in the outermost ply 308. In the example shown, each one of the nubs 406 may be configured to fill a majority of the volume of a corresponding divot 350. When heat 212 (FIG. 10) is applied to the composite preform 300, the resulting reduction in resin viscosity may allow the resin 312 (FIG. 11) to fill any gaps between the surface texture 404 and the ply surface 310 (FIG. 11) of the composite preform 300. The compaction pressure 214 resulting from the application of a vacuum (not shown) on the vacuum bag 204 (FIG. 10) may consolidate the composite preform 300 (FIG. 11) and may assist in displacing resin 312 and air (not shown) that may be located or trapped between the surface texture 404 of the caul plate 106 and the composite ply 306 of the composite preform 300.

FIG. 13 is a perspective view illustration of a cured composite article 322 cured using a surface texture 404 (FIG. 11) incorporated into the caul surface 108 (FIG. 11) of the caul plate 106 (FIG. 11). FIG. 14 is a plan view of a portion of the cured composite article 322 of FIG. 13 and illustrating the imprinting of the surface texture 404 on the outermost ply 308. By providing a surface texture 404 that matches the ply surface 310 geometry of the fiber tows 314 and divots 350 (FIG. 3) in the composite preform 300, surface porosity (e.g., surface pitting) in the cured composite article 322 may be reduced or prevented.

FIG. 15 is a perspective view illustration of an example of a resin-wetting control layer 400 configured as a compliant layer 420 formed of elastomeric material. In some examples, a compliant layer 420 may be integral with a forming surface of a forming tool 102 (FIG. 10). A compliant layer 420 may also be integral with a caul surface 108 (FIG. 10) of caul plate 106 (FIG. 10). In this regard, the compliant layer 420 may comprise a caul plate 106 (FIG. 10). In still further examples, a compliant layer 420 may be integral with one or both core surfaces 364 (FIG. 19) of a core 358 (FIG. 19) that may be sandwiched between inner plies 307 (FIG. 19) of the composite preform 300 (FIG. 19). Alternatively, a compliant layer 420 may be separately formed as a panel 402 (FIG. 15) which may be permanently coupled to a forming tool 102, a caul plate 106 (FIG. 10), and/or a core 358 (FIG. 19) such as by adhesive bonding and/or by mechanical fastening. In a still further embodiment, a compliant layer 420 may be removably applied (e.g., non-fixedly attached) to the forming tool 102 after which a composite preform 300 (FIG. 10) may be laid up on the compliant layer 420. A separate compliant layer 420 may be applied over the composite preform 300 after which a caul plate 106 may optionally be applied on top of the compliant layer 420 prior to vacuum bagging and curing of the composite preform 300.

FIG. 16 is a magnified view of a portion of a compliant layer 420 illustrating a layer thickness 424 along which the compliant layer 420 is compliant in a through-the-thickness direction 422. As mentioned above, the compliant layer 420 may be formed of an elastomeric material. In some examples, the elastomeric material may be a sheet of rubber, silicone, urethane, thermoplastic material, thermosetting material, and/or another elastomeric composition. The elastomeric material may preferably be chemically non-reactive with the resin 312 (FIG. 14) and/or chemically non-reactive with the fiber material (not shown) of the composite preform 300 in the sense that the elastomeric material will not bond to the composite preform 300 and will not materially change (e.g., will not accelerate, retard, etc.) the curing parameters of the resin or affect the material properties of the cured composite article 322 (FIG. 2). In some examples, the compliant layer 420 may be provided in a layer thickness 424 in the range of from 0.002 inch up to 0.12 inch to allow the compliant layer 420 to conform to the ply surface 310 geometry of the fiber tows 314 (FIG. 14) and divots 350 in the composite preform 300.

Referring still to FIG. 16, as described in greater detail below, the compliant layer 420 may be compressed against the ply surface 310 of an outermost ply 308 (FIG. 18) of a composite preform 300 (FIG. 18) until at least some localized portions 426 (FIG. 18) of the compliant layer 420 at least partially fill at least some of the divots 350 in the outermost ply 308. In one example, the compliant layer 420 may be compressed onto a composite ply 306 such as an outermost ply 308 and/or an inner ply (FIG. 19) using compaction pressure 214 applied by a vacuum bag 204 (FIG. 10) under vacuum pressure (not shown). However, the compliant layer 420 may be compressed using mechanical means (not shown) such as a mechanical press (not shown).

The compliant layer 420 may be compressed onto a composite ply 306 using a level of compaction pressure 214 causing localized portions 426 of the compliant layer 420 to at least partially fill at least some of the divots 350 and thereby displace, prevent, or avoid resin 312 and gas bubbles (not shown) in the divots 350 during curing of the resin 312 (FIG. 18) of the composite preform 300 in a manner similar to the above-described manner in which the surface features 405 (e.g., nubs 406—FIG. 8) displace, prevent, or avoid resin 312 and gas bubbles (not shown) in the divots 350. In this regard, the at least partial filling of the divots 350 by the localized portions 426 of the compliant layer 420 may reduce the total amount of volatiles (not shown) produced by the resin 312 and which may otherwise become trapped in the divots 350. The localized portions 426 (FIG. 18) of the compliant layer 420 (FIG. 18) may increase the wettability of the composite preform 300 in proportion to the decrease in gases (e.g., trapped air and/or volatiles) at the interface (not shown) of the composite preform 300 surface (not shown) with the tool surface 104, the caul surface 108, and/or one or both of the core surfaces 364 (FIG. 19).

In FIG. 16, as indicated above, the compliant layer 420 may have an uncompressed layer thickness 424 in the range of from 0.002-0.12 inch. However, the compliant layer 420 may be provided in thicknesses greater than 0.12 inch. In addition, the compliant layer 420 is preferably provided in a layer thickness 424 and a durometer (not shown) or hardness (e.g., Shore A hardness) that prevents distortion of the composite preform 300 when the compliant layer 420 is compressed against a composite ply 306 (e.g., an outermost ply 308 and/or an inner ply 307—FIG. 19) such as during resin infusion and/or during curing of the composite preform 300.

FIG. 17 is an exploded side view illustration of a portion of a caul plate 106 (FIG. 12) configured as a compliant layer 420 prior to assembly with a composite preform 300. The compliant layer 420 may have a layer thickness 424 that may be at least as large as the divot depth 352 (FIG. 6). In addition, the compliant layer 420 may be provided in a relatively low durometer or hardness to allow the compliant layer 420 to resiliently conform to the ply surface 310 of the composite preform 300. For example, the compliant layer 420 may have a Shore A hardness of less than 70. In some examples, the compliant layer 420 may have a Shore A hardness in the range of 20-70. In still other examples, the compliant layer 420 may have a Shore A hardness in the range of 30-60.

As indicated below, the selection of the durometer (e.g., the Shore A hardness) of the compliant layer 420 (FIG. 17) may be based at least in part upon the layer thickness 424 (FIG. 17) of the compliant layer 420. In this regard, the combination of the Shore A hardness and layer thickness 424 of the compliant layer 420 may be chosen to ensure that the compliant layer 420 will conform into the divots 350 (FIG. 17) of the outermost ply 308 (FIG. 17) of the composite preform 300 (FIG. 17) during processing (e.g., during consolidation and/or curing) of the composite preform 300. In addition, as mentioned above, the compliant layer 420 is preferably provided in a layer thickness 424 and a hardness (e.g., Shore A hardness) that prevents distorting the composite preform 300 such as during resin infusion and/or during curing of the composite preform 300.

FIG. 18 is a side view illustration of the caul plate 106 (FIG. 12) and composite preform 300 in an assembled state. Compaction pressure 214 may be applied to the compliant layer 420 by a vacuum bag 204 (FIG. 10) causing localized portions 426 of the compliant layer 420 to at least partially fill the volume of the divots 350 of the outermost ply 308. In the example shown, the compliant layer 420 may have a relatively low durometer (e.g., low Shore A hardness) allowing for conformance of the compliant layer 420 into the divots 350.

Referring to FIGS. 18-19, as indicated above, the selection of the Shore A hardness for the compliant layer 420 may be at least partially dependent upon the layer thickness 424 of the compliant layer 420 to ensure that the compliant layer 420 will deform and at least partially fill the divots 350 in the outermost ply 308 when compaction pressure 214 is applied onto the composite preform 300 such as during the application of vacuum pressure (not shown) on the vacuum bag 204 (FIG. 10). A compliant layer 420 of relatively low Shore A hardness (e.g., in the range of 30-50) may allow for a relatively small layer thickness 424 (e.g., 0.002-0.060 inch) while enabling localized portions 426 (FIG. 18) of the compliant layer 420 to conform to and fill at least a portion (e.g., at least 50%) of the volume of the divots 350 of the outermost ply 308. Conversely, a compliant layer 420 of relatively high Shore A hardness (e.g., in the range of 50-70) may dictate a relatively large layer thickness 424 (e.g., at least 0.060 inch) to enable localized portions 426 (FIG. 18) of the compliant layer 420 to conform to and fill at least a portion (e.g., at least 50%) of the volume of the divots 350 of the outermost ply 308.

FIG. 19 is an exploded side view illustration of a bagging system 202 (FIG. 9) for curing a composite preform 300 having a core 358 located in an interior of the composite preform 300. The core 358 may have opposing core surfaces 364 and may be interposed or sandwiched between inner plies 307 of the composite preform 300. In some examples, the core 358 may be formed of a relatively low-density material. For example, the core 358 may be formed of foam, honeycomb, balsa wood, or any other low-density material of any composition including polymeric material, ceramic material, and/or metallic material. In the example shown, the core 358 may have core edges 360 that may be chamfered or tapered in core thickness 362. The tapered core 358 may result in a non-planar global contour (not shown) of the ply surface 310 of the composite preform 300.

Referring still to FIG. 19, in one example, the caul plate 106 may be provided as a relatively stiff component contoured complementary to the global contour (not shown) of the ply surface 310 of the composite preform 300 as a result of the tapered core 358. Alternatively, the caul plate 106 may be formed of a sheet of material that is flexible in an out-of-plane direction to allow the caul plate 106 to conform to any one of a variety of different contours. In some examples, the caul plate 106 may be provided as an elastomeric material which may be bendable to allow the caul plate 106 to conform to the ply surface 310 of the composite preform 300. Although FIG. 19 illustrates a resin-wetting control layer 400 included with the caul plate 106 for application to the contoured upper surface (not shown) of the composite preform 300, a resin-wetting control layer 400 may also be applied to a contoured lower surface (not shown) of the composite preform 300. For example, a resin-wetting control layer 400 contoured complementary to the lower surface (not shown) may be associated with (e.g., integrally-formed with or removably coupled to) a forming tool 102. In an embodiment, a resin-wetting control layer 400 may be relatively stiff and may be contoured complementary to the global contour (not shown) of the lower surface (not shown) of the composite preform 300, or the resin-wetting control layer 400 may be bendable to allow the resin-wetting control layer 400 to conform to the global contour (not shown) of the lower surface (not shown) of the composite preform 300.

Referring still to FIG. 19, as indicated above, in some embodiments, one or both of the opposing core surfaces 364 of a core 358 may include a resin-wetting control layer 400 configured complementary to a ply surface 310 of an inner ply 307 in contact with the core 358. As mentioned above, a resin-wetting control layer 400 may be integrally formed with a core surface 364 or the resin-wetting control layer 400 may be provided as a separate panel (not shown) that may be coupled to a core surface 364 such as by adhesive bonding (not shown) to the core 358. When the resin-wetting control layer 400 of the core 358 is mated to an inner ply 307 of a composite preform 300, the resin-wetting control layer 400 may at least partially fill at least some of the divots 350 of the inner ply 307 and may thereby prevent or displace resin 312 (FIG. 1) and gases (not shown) in at least some of the divots 350 during resin infusion and/or during curing of the composite preform 300. As described above, displacement of resin 312 in the divots 350 may result in a reduction in volatiles (not shown) produced by the resin 312 at the interface (not shown) of the core surface 364 and the resin-wetting control layer 400 and may thereby reduce the amount of trapped gas (e.g., volatiles not shown) at such interface (not shown) which may reduce or prevent surface porosity (not shown) at the interface (not shown) of the core surface 364 and the resin-wetting control layer 400. In addition, preventing or displacing resin 312 in the divots 350 may have the effect of increasing the fiber volume fraction of the cured composite article 322 (FIG. 2) resulting in an improvement in the specific strength and/or stiffness of the cured composite article 322, as mentioned above.

In any of the examples disclosed herein, a resin-wetting control layer 400 (FIG. 1) may be provided as a surface texture 404 (FIG. 1), as a compliant layer 420 (FIG. 16), or as a combination of a surface texture 404 and a compliant layer 420. In an embodiment, a resin-wetting control layer 400 may be manufactured as a compliant layer 420 having a surface texture 404 by forming a cast (not shown) of relatively low durometer (e.g., Shore A hardness of 20-40) rubber (e.g., silicone rubber) on dry woven fabric (not shown) to form a surface texture 404 in the cast replicating the texture (not shown) of the woven fabric 318 (FIG. 5). The resulting silicone rubber cast (not shown) may be applied to an outermost ply (not shown) of woven fabric (not shown) on a tool side (not shown) and/or part side (not shown) of a composite preform (not shown) with the surface texture (not shown) filling the divots (not shown) of the outermost ply. Due to its softness (e.g., relatively low Shore A hardness), a silicone rubber cast (not shown) may also conform to global contours (not shown) in an outermost ply (not shown) of the composite preform (not shown), such as a global contour of the outermost ply 308 (FIG. 19) occurring as a result of tapered-thickness core edges 360 (FIG. 19) of a core (FIG. 19) that may be included in the composite preform 300 (FIG. 19).

Figure 20:
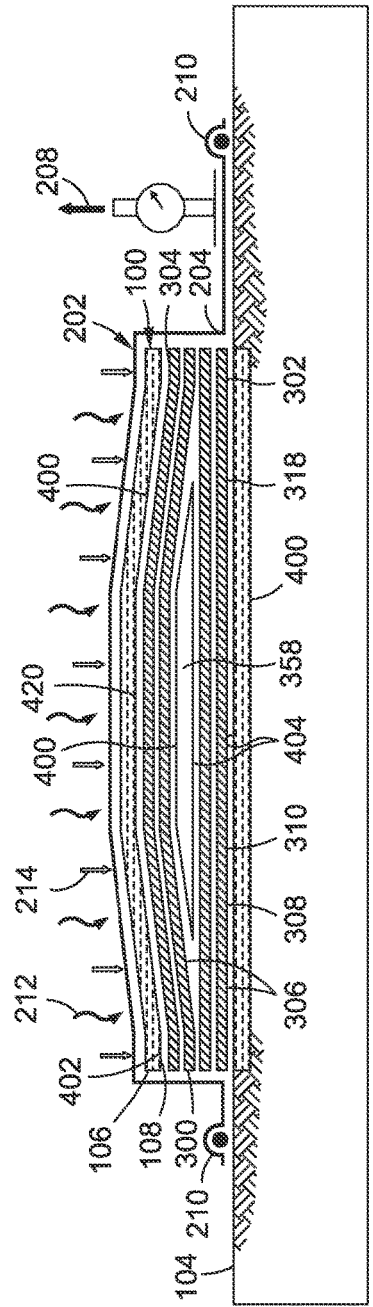
FIG. 20 is a side view illustration of the bagging system of FIG. 19 showing the application of heat and compaction pressure to the composite preform sandwiched between the resin-wetting control layers of the forming tool and the caul plate.

FIG. 20 is a side view illustration of the bagging system 202 (FIG. 9) of FIG. 19 showing a vacuum bag 204 sealing the composite preform 300 to the forming tool 102 using edge sealant 210 (FIG. 20). Heat 212 (FIG. 10) and compaction pressure 214 (FIG. 10) may be applied to the composite preform 300 sandwiched between the resin-wetting control layers 400 of the forming tool 102 (FIG. 19) and the caul plate 106. As indicated above, each resin-wetting control layer 400 may conform to the ply surface 310 geometry of an outermost ply 308 and the inner plies 307 adjacent the core 358 and may thereby imprint a texture (not shown) conforming to the ply surface 310 of the composite preform 300 to facilitate uniform wetting of the ply surface 310 to thereby reduce or prevent surface porosity in the cured composite article 322 (FIG. 14).

Figure 21:
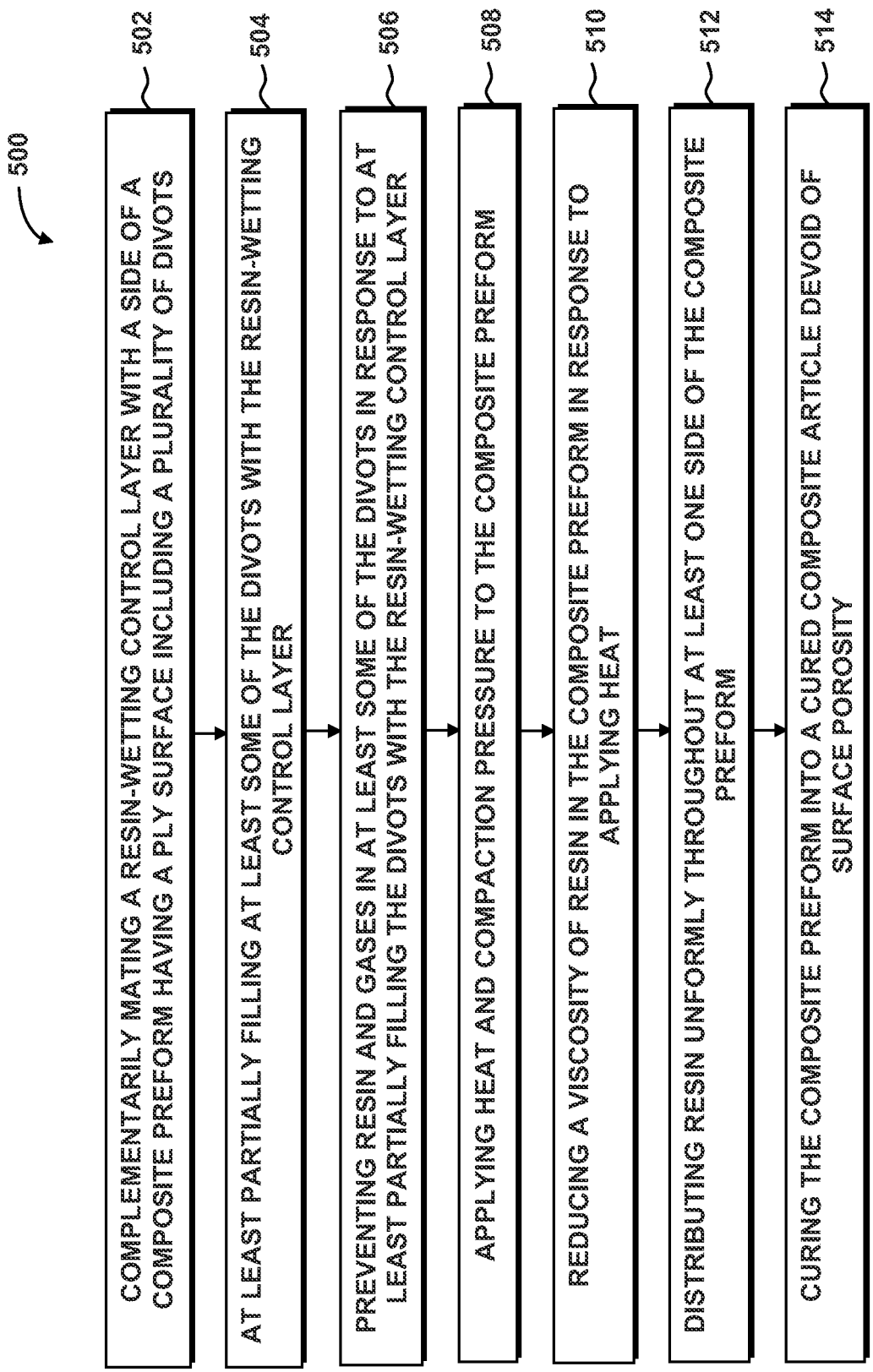
FIG. 21 is an illustration of a flowchart having one or more operations that may be included in a method of controlling surface porosity of a composite preform.

FIG. 21 is an illustration of a flowchart having one or more operations that may be included in a method 500 of manufacturing a composite article 322 (FIG. 2) and which may include controlling surface porosity (not shown) of the composite article 322. As described in greater detail below, the method 500 may include controlling the wettability of a tool side 302 (FIG. 1), a caul side 304 (FIG. 1) and/or a core side 305 (FIG. 1) of a composite preform 300 (FIG. 1) using one or more resin-wetting control layers 400 (FIG. 1). Wettability may be described as the relative amount of surface area that may be covered by resin 312 (FIG. 1). For example, 100% wettability may be described as a condition wherein 100% of a ply surface 310 (FIG. 1) of a composite preform 300 is covered by resin 312 during curing of the composite preform 300, and which may result in the cured composite article 322 being devoid of surface porosity. As indicated above, a resin-wetting control layer 400 may be associated with a tool surface 104 of a forming tool 102 (FIG. 1). Alternatively or additionally, a resin-wetting control layer 400 may be associated with a caul surface 108 of a caul plate 106 (FIG. 1). In still further examples, a resin-wetting control layer 400 may be associated with a core surface 364 of a core 358.

Step 502 of the method 500 (FIG. 21) may include complementarily mating a resin-wetting control layer 400 (FIG. 1) with a side of a composite preform 300. For example, the method 500 may include complementarily mating a resin-wetting control layer 400 with an outermost ply 308 of at least one of a tool side 302 and a caul side 304 of a composite preform 300 having a plurality of divots 350. Alternatively or additionally, the method may include complementarily mating a resin-wetting control layer 400 with an inner ply 307 (FIG. 19) on a core side 305 (FIG. 19) of a composite preform 300. The implementation of step 502 may include providing a forming tool 102 (FIG. 1) having a tool surface 104 (FIG. 1) including a resin-wetting control layer 400 (FIG. 1). The forming tool 102 may be formed of any suitable metallic or non-metallic material including, but not limited to, steel, aluminum, Invar™, composite material, ceramic material, or other material. As indicated above, in some examples, the resin-wetting control layer 400 may be integral with the tool surface 104 of the forming tool 102. For example, the resin-wetting control layer 400 may be a surface texture 404 that may be machined, cast, molded, or otherwise formed into the tool surface 104 of the forming tool 102.

For examples where the resin-wetting control layer 400 is formed as a separate component from the forming tool 102 (FIG. 9), the method 500 (FIG. 21) may include removably applying the resin-wetting control layer 400 (FIG. 11) to the forming tool 102. For examples where the resin-wetting control layer 400 is a surface texture 404 (FIG. 11) formed as a plurality of surface features 405 (FIG. 11) such as nubs 406 (FIG. 11), the method 500 may include placing the resin-wetting control layer 400 in contact with an outermost ply 308 (FIG. 11) of the composite preform 300 (FIG. 11). For examples where the outermost ply 308 of the composite preform 300 is a woven fabric 318 (e.g. prepreg) having a plurality of divots 350 (FIG. 11), the method 500 may include positioning the surface features 405 of the surface texture 404 in alignment with the divots 350, as described in greater detail below. For examples where the composite preform 300 includes a core 358 (FIG. 19) sandwiched between inner plies 307 (FIG. 19), the method 500 may include placing the resin-wetting control layer 400 of a core surface 364 (FIG. 19) in contact with the ply surface 310 (FIG. 19) of an inner ply 307 (FIG. 19).

Step 504 of the method 500 (FIG. 21) may include at least partially filling at least some of the divots 350 with the resin-wetting control layer 400. For example, for an embodiment of the resin-wetting control layer 400 comprising a surface texture 404 having a plurality of surface features 405, the mating of the resin-wetting control layer 400 with a composite ply 306 (e.g., an outermost ply 308 or an inner ply 307) of the composite preform 300 may result in filling at least some of the divots 350 (FIG. 3) with corresponding surface features 405 (e.g., nubs 406) of the surface texture 404 of the resin-wetting control layer 400. As described in greater detail below, the surface features 405 may be configured complementary to a complex contour (e.g., a plurality of divots 350—FIG. 3) of the ply surface 310 of the composite preform 300 (not shown). As indicated below, at least partially filling the divots 350 may prevent entry of resin in the divots 350 which may reduce volatiles (not shown) generated by resin 312 near the interface (not shown) of a resin-wetting control layer 400 and a ply surface 310 and thereby assist in preventing volatiles (not shown) that may otherwise be trapped in the divots 350 resulting in surface porosity. As also indicated below, the at least partial filling of the divots 350 may increase the fiber volume fraction of the cured composite article 322 (FIG. 2) which may increase the specific strength and/or specific stiffness of the cured composite article 322.

Step 506 of the method 500 (FIG. 21) may include preventing resin 312 (FIG. 19) and/or gases (not shown) for entering a space in at least some of the divots 350 which may be at least partially occupied or filled by a complementary structure 401 (FIG. 12—e.g., surface features 405; localized portions 426—FIG. 18) of the resin-wetting control layer 400. Residency of resin 312 and/or gas within one or more of the divots 350 may be prevented by the resin-wetting control layer 400 at least partially occupying or filling the divots 350 during consolidation and/or curing of the composite preform 300. As described in greater detail below, the process of filling the divots 350 as a result of the mating of the resin-wetting control layer 400 with a composite ply 306 may result in preventing or displacing resin 312 and/or air (not shown) from entering or occupying the divots 350 which may advantageously reduce or prevent surface porosity in the cured composite article 322 (FIG. 2).

In addition, as a result of filling the divots 350, the method 500 may include reducing volatiles (not shown) generated by resin 312 near the interface (not shown) of a resin-wetting control layer 400 and a ply surface 310 and may thereby assist in preventing volatiles (not shown) that may otherwise be trapped in the divots 350 at such interfaces (not shown) between the ply surface 310 and the resin-wetting control layer 400. Even further, the method may include increasing the fiber volume fraction of the cured composite article 322 (FIG. 2) with a resulting increase in specific strength and/or specific stiffness of the cured composite article 322 as a result of displacement and/or prevention of resin 312 in the divots 350 due to filling the divots 350 with the resin-wetting control layer 400. As indicated above, the method may include at least partially filling the divots 350 with surface features 405 (e.g., nubs 406—FIG. 8) and/or with localized portions 426 (FIG. 18) of a through-the-thickness compliant layer 420 (FIG. 18) to increase the wettability of a ply surface 310 in proportion to the decrease in volatiles (not shown) in resin 312 near an interface (not shown) between a resin-wetting control layer 400 and the ply surface 310.

In an embodiment, the resin-wetting control layer 400 may be configured as a compliant layer 420 (FIG. 18) being compliant along a through-the-thickness direction 422 (FIG. 11), as indicated above. The method 500 (FIG. 21) may include placing a compliant layer 420 in contact with a composite ply 306 (e.g., an outermost ply 308 or an inner ply 307—FIG. 19) of a composite preform 300, and compressing the compliant layer 420 against a ply surface 310 of the composite ply 306 resulting in at least partially filling at least some of the divots 350 with localized portions of the compliant layer 420. In some examples, the compliant layer 420 may be compressed against the ply surface 310 of a dry fiber preform (not shown) prior to infusing the dry fiber preform with resin 312 (FIG. 1) and curing. In other examples, the composite preform 300 may be formed of prepreg composite plies (not shown) and the compliant layer 420 may be compressed against the ply surface 310 of the composite preform 300 prior to the application of heat 212 FIG. 1) to the composite preform 300 to reduce the viscosity of the resin 312 prior to curing. As shown in FIG. 18, the method may include applying compaction pressure 214 to compress the compliant layer 420 against the ply surface 310 of the outermost ply 308 such that localized portions 426 of the compliant layer 420 at least partially fill the divots 350. In this regard, the compliant layer 420 becomes functional as a resin-wetting control layer 400 when at least some of the localized portions at least partially fill at least some of the divots 350 in the outermost ply 308.

As indicated above, the compliant layer 420 may be provided as an elastomeric material. In one example, the elastomeric material may be silicone rubber although other types of elastic material having through-the-thickness compliance may be used. The compliant layer 420 may be fixedly coupled to a forming tool 102, a caul plate 106, or a core 358. For example, the compliant layer 420 may be adhesively bonded and/or mechanically fastened to a forming tool 102 and/or to the caul plate 106 (FIG. 12). A compliant layer 420 may also be adhesively bonded and/or mechanically coupled to one or both of opposing core surfaces 364 (FIG. 19) of a core 358 (FIG. 19). Alternatively, the compliant layer 420 be provided as a separate component (not shown) that may be removably applied to the forming tool 102 (FIG. 10) prior to layup of the composite plies 306 and/or the compliant layer 420 may be installed over the composite preform 300 optionally followed by positioning a caul plate 106 on top of the compliant layer 420.

As mentioned above, the method 500 (FIG. 21) may include laying up one or more composite plies 306 on a forming tool 102 to form a composite preform 300. For examples where the forming tool 102 (FIG. 9) includes a resin-wetting control layer 400 (FIG. 9), the method may include laying up the composite plies 306 (FIG. 9) over the resin-wetting control layer 400. In some examples, the composite plies 306 may be prepreg composite plies (not shown). However, in other examples, the method may include laying up a dry fiber preform (not shown) such as dry fiber composite plies (not shown), and then infusing resin 312 (FIG. 1) into the dry fiber preform using any one of a variety of resin infusion processes including, but not limited to, vacuum-assisted resin transfer molding (VARTM), resin transfer molding (RTM), resin film infusion (RFI), or other wet layup processes.

As indicated above, the surface (not shown) of the resin-wetting control layer 400 may be shaped complementary to a contour (not shown) or surface geometry (not shown) of the ply surface 310 of the composite plies (not shown) in contact with the resin-wetting control layer 400. For example, a resin-wetting control layer 400 may have a surface geometry (not shown) configured complementary to a complex contour 311 (e.g., a plurality of divots 350—FIG. 3) of the ply surface 310 (FIG. 2) of a composite ply 306 (FIG. 5). Such complex contour 311 of the ply surface 310 may occur as a result of undulations of the crossing fiber tows for 14 (FIGS. 3-5) of a woven fabric 318 (FIG. 5) composite ply 306 and resulting in divots 350 (FIG. 4) in the ply surface 310 of the composite ply 306.

As indicated above, the composite plies 306 (FIG. 9) may be laid up such that the resin-wetting control layer 400 (FIG. 9) conforms to the geometry (not shown) of the ply surface 310 (FIG. 9) of the composite preform 300 (FIG. 9). For example, the resin-wetting control layer 400 may be provided as a surface texture 404 (FIG. 9) having surface features 405 (FIG. 9) configured complementary to the divots 350 (FIG. 9) in a ply surface 310 of outermost ply 308 of a composite preform 300 laid up over the surface texture 404 prior to resin infusion. As mentioned above, the method may include at least partially filling, when laying up the composite plies 306 over the surface texture 404, a space 351 (FIG. 6) or volume of the divots 350 in the ply surface 310 (FIG. 9) of the outermost ply 308. The method may include placing the surface texture 404 of the resin-wetting control layer 400 in contact with the composite ply 306 (FIG. 9) with the plurality of nubs 406 (FIG. 9) correspondingly nested within the plurality of divots 350. The process of filling the divots 350 may result in displacing resin 312 and/or air in the divots 350 which may otherwise result in surface porosity in the cured composite article 322 (FIG. 2), as described above. As indicated above, in one example, each one of the surface features 405 (e.g., nubs 406) may be sized and configured to fill at least 50% of the volume of a corresponding divot 350 in the woven fabric 318 (FIG. 9). More preferably, in another example, each one of the surface features 405 may be sized and configured to fill from 90-100% of the volume of a corresponding divot 350.

In some examples, the process of laying up the composite preform 300 (FIG. 19) may include positioning a core 358 (FIG. 19) between inner plies 307 within an interior of the composite preform 300. The core 358 may be formed of a relatively low-density material and may include core edges 360 (FIG. 19) which may or may not be tapered in thickness. Additional composite plies 306 may be laid up over the core 358 until achieving a desired thickness of the composite preform 300. For composite preforms 300 including a core 358 (FIG. 19), the method 500 may include mating a resin-wetting control layer 400 of a core surface 364 (FIG. 19) to an inner ply 307 (FIG. 19) of the composite preform 300 during layup. As indicated above, the resin-wetting control layer 400 may be integrally formed on one or both of the opposing core surfaces of a core 358. For example, a surface texture 404 may be machined or molded into one or both of the opposing core surfaces 364 of a core 358 prior to applying or installing the core 358 on the composite preform 300.

Alternatively, a resin-wetting control layer 400 (FIG. 19) be provided as a separate panel (not shown) that may be mated to an inner ply 307 (FIG. 19) prior to installing a core 358 (FIG. 19) over the separate panel (not shown). In still other examples, a resin-wetting control layer 400 may be assembled with (e.g., adhesively bonding) the core surfaces 364 (FIG. 19) on one side of the core 358 prior to applying or installing the core 358 on the composite preform 300, followed by laying up an inner ply 307 over a resin-wetting control layer 400 that may be associated with a core surface 364 on an opposite side of the core 358. Layup of the composite preform 300 may include laying up additional composite plies 306 (FIG. 19) over the inner ply 307 located on top of the core 358.

In some examples, the method 500 (FIG. 21) may include applying a caul plate 106 (FIG. 11) over the composite preform 300. As indicated above, the caul plate 106 may include a caul surface 108 (FIG. 11) optionally including a resin-wetting control layer 400 (FIG. 11). The method may include applying the caul plate 106 over the composite preform 300 in a manner such that the resin-wetting control layer 400 of the caul plate 106 is placed in contact with an outermost ply 308 of the composite preform 300 (FIG. 11). The resin-wetting control layer 400 may be configured to at least partially conform to the contours (not shown) of the ply surface 310 (FIG. 11) of the composite preform 300. For examples where the composite plies 306 (e.g., the inner plies 307 and the outermost plies 308) of the composite preform 300 are formed of woven fabric 318 (FIG. 11) having a plurality of divots 350 and the resin-wetting control layer 400 is provided as a surface texture 404 (FIG. 11) having a plurality of surface features 405, the method 500 may include aligning the surface features 405 with the composite plies 306 (FIG. 11) such that the surface features 405 (FIG. 11) fill the divots 350 (FIG. 11) in the ply surfaces 310 of the composite preform 300.

As indicated above, in some examples, the resin-wetting control layer 400 may be integrally formed with the caul plate 106 (FIG. 11). For example, the caul plate 106 may be formed of metallic material e.g., aluminum) with a surface texture 404 (FIG. 11) that may be machined or cast into the caul surface 108 (FIG. 11) of the caul plate 106. In other examples, resin-wetting control layer 400 (FIG. 11) may be provided as a separate component that may be removably applied over the composite preform 300 after which the caul plate 106 may be applied over the resin-wetting control layer 400.

As described above, the presently-disclosed method 500 (FIG. 21) may provide a means for controlling, using the resin-wetting control layer 400 (FIG. 10) of the forming tool 102 (FIG. 10) and/or the caul plate 106, the wettability of the tool side 302 and the caul side 304 (FIG. 10) of the composite preform 300 (FIG. 10) in response to at least partially filling the divots 350 using the resin-wetting control layer 400. Control of the wettability may result in distributing resin 312 uniformly throughout or along the ply surface 310 (FIG. 10) of the tool side 302 (FIG. 10) and/or the caul side 304 of the composite preform 300. In some examples, by placing a resin-wetting control layer 400 in contact with a ply surface 310 of a composite preform 300, the divots 350 (FIG. 9) of the composite preform 300 may be filled which may prevent resin 312 and air pockets (not shown) from entering or forming in the divots 350.

In the case of a composite preform 300 (FIG. 1) formed of prepreg composite plies (not shown), a resin-wetting control layer 400 (FIG. 1) may be applied to a ply surface (not shown) of the composite preform 300 (FIG. 1) prior to heating of the prepreg composite plies (not shown) causing a reduction in resin viscosity and facilitating infusion of the reduced-viscosity resin 312 (FIG. 1) throughout the composite plies including within gaps (not shown) between adjacent fiber tows 314 (FIG. 1). The filling of the divots 350 in the prepreg composite ply (not shown) may allow the reduced-viscosity resin 312 (FIG. 1) to uniformly cover the ply surface (not shown) of the composite preform 300 at the interface (not shown) between the resin-wetting control layer 400 and the ply surface (not shown) of the composite preform 300. In the case of a composite preform 300 formed of a dry fiber preform (not shown), the resin-wetting control layer 400 may fill the divots 350 in the ply surface (not shown) of the dry fiber preform (not shown) prior to infusion of resin 312 (FIG. 1) into the composite preform 300 and thereby preventing air pockets (not shown) in the divots 350.

Step 508 of the method 500 (FIG. 21) may include applying heat 212 (FIG. 10) and compaction pressure 214 (FIG. 1) to cure the composite preform 300. The assembly of the forming tool 102, composite preform 300, caul plate 106, and/or core 358, and associated resin-wetting control layers 400 may be vacuum-bagged as shown in FIG. 10. Heat 212 may be applied by any suitable means including convection heating (not shown) in an autoclave 200 (FIG. 1) or in a convection oven 201 (FIG. 1), by direct heating of the composite preform 300 such as with resistive elements (not shown) or heating pads (not shown), radiation heating (not shown), or other suitable heating means. Compaction pressure 214 may be applied on the composite preform 300 by drawing a vacuum on the vacuum bag 204. The compaction pressure 214 may consolidate the composite preform 300 and force out excess resin 312 (FIG. 1), volatiles (not shown), gas, and moisture, and promote the uniform distribution of resin 312 within the composite preform 300 and along and/or throughout the ply surfaces 310 (e.g., an upper surface or lower surface—not shown) of the composite preform 300. Autoclave pressure (not shown) may be applied to augment the compaction pressure 214 provided by the vacuum on the vacuum bag 204. In some examples, the application of compaction pressure 214 may increase the amount by which a resin-wetting control layer 400 fills the divots 350 of a ply surface 310, and cause the displacement or prevention of resin 312 and/or gases (e.g., volatiles) in the divots 350 which may result in an increase in the fiber volume fraction of a cured composite article 322 (FIG. 2) while also reducing or preventing surface porosity in the ply surfaces 310 (FIG. 19) that are in contact with a resin-wetting control layer 400.

The bagging system 202 may include one or more layers (not shown) such as a breather layer (not shown) to facilitate the uniform application of compaction pressure 214 (FIG. 20) on the composite preform 300 (FIG. 20) in the absence of a caul plate 106 (FIG. 20). Additional layers (not shown) may be included with the bagging system 202 (FIG. 10) such as a release layer (not shown) to facilitate the removal of the vacuum bag 204 (FIG. 10) from the cured composite article 322 (FIG. 1). Prior to laying up the composite plies 306 (FIG. 20), a release coat or film (not shown) may be applied to the resin-wetting control layer 400 on the forming tool 102 (FIG. 10) and/or on the caul plate 106 to prevent bonding of the resin-wetting control layer 400 (FIG. 10) to the composite preform 300 during cure. Although the composite preform 300 is shown vacuum-bagged in FIGS. 10 and 20, consolidation and/or curing of the composite preform 300 may be performed using other means for applying compaction pressure 214 including, but not limited to, a mechanical press or other compaction means.

Step 510 of the method 500 (FIG. 21) may include reducing the viscosity of the resin 312 (FIG. 1) in the composite preform 300 (FIG. 1) in response to applying heat 212 (FIG. 1) to the composite preform 300 (FIG. 1). In addition, heat 212 applied to the composite preform 300 may initiate cross-linking of the polymers in a thermosetting resin 312 to promote curing. However, in some examples, the composite preform 300 may be provided in a material system that allows for curing of the resin 312 without the application of heat 212.

Step 512 of the method 500 (FIG. 21) may include distributing resin 312 uniformly throughout a surface area (not shown) of the ply surface 310 (FIG. 20) of the tool side 302 (FIG. 20) and/or the caul side 304 (FIG. 20) of the composite preform 300 (FIG. 20) in response to at least partially filling at least some of the divots 350 with the resin-wetting control layer 400 (FIG. 20). In some examples, the application of compaction pressure 214 (FIG. 20) may promote resin flow to allow for wettability of an entirety of the ply surface 310 on the tool side 302 (FIG. 20) and/or caul side 304 (FIG. 20) of the composite preform 300. As indicated above, the conformance of the resin-wetting control layer 400 to the ply surface 310 of the composite preform 300 may facilitate uniform wetting of the ply surface 310. Such uniform wetting may occur as a result of a reduction or avoidance of gaps (not shown) that may occur between a conventional caul plate (not shown) and the contour of the fiber tows 314 (FIG. 18) and divots 350 (FIG. 3) that define the ply surface 310 of a composite ply 306 (FIG. 20).

Step 514 of the method 500 (FIG. 21) may include curing the composite preform 300 into a cured composite article 322 (FIG. 2) having reduced or non-existent surface porosity (not shown) in one or more ply surfaces 310 (FIG. 1) of the composite plies 306 (FIG. 1) including the outermost plies (FIG. 19) and/or in the inner plies (FIG. 19) in examples where the composite preform 300 includes a core 358 (FIG. 19). In some examples, the cured composite article 322 may be devoid of surface pitting in a tool side 302 (FIG. 1), a caul side 304 (FIG. 1), and/or a core side 305 (FIG. 1). As indicated above, curing of the composite preform 300 (FIG. 9) may be facilitated by the application of heat 212 (FIG. 10) and/or compaction pressure 214 (FIG. 10). During the curing process, the temperature of the composite preform 300 may be elevated and maintained at one or more cure temperatures for one or more hold periods until the completion of cure after which the temperature of the composite preform 300 may be allowed to reduce such as by discontinuing the application of heat 212. Advantageously, by including resin-wetting control layers 400 with the tool surface 104 of a forming tool 102, the caul surface 108 of a caul plate 106, and/or one or more core surfaces 364 of a core 358 (FIG. 1), surface porosity (not shown) or surface pitting (not shown) in the cured composite article 322 may be significantly reduced or prevented.

Figure 22:
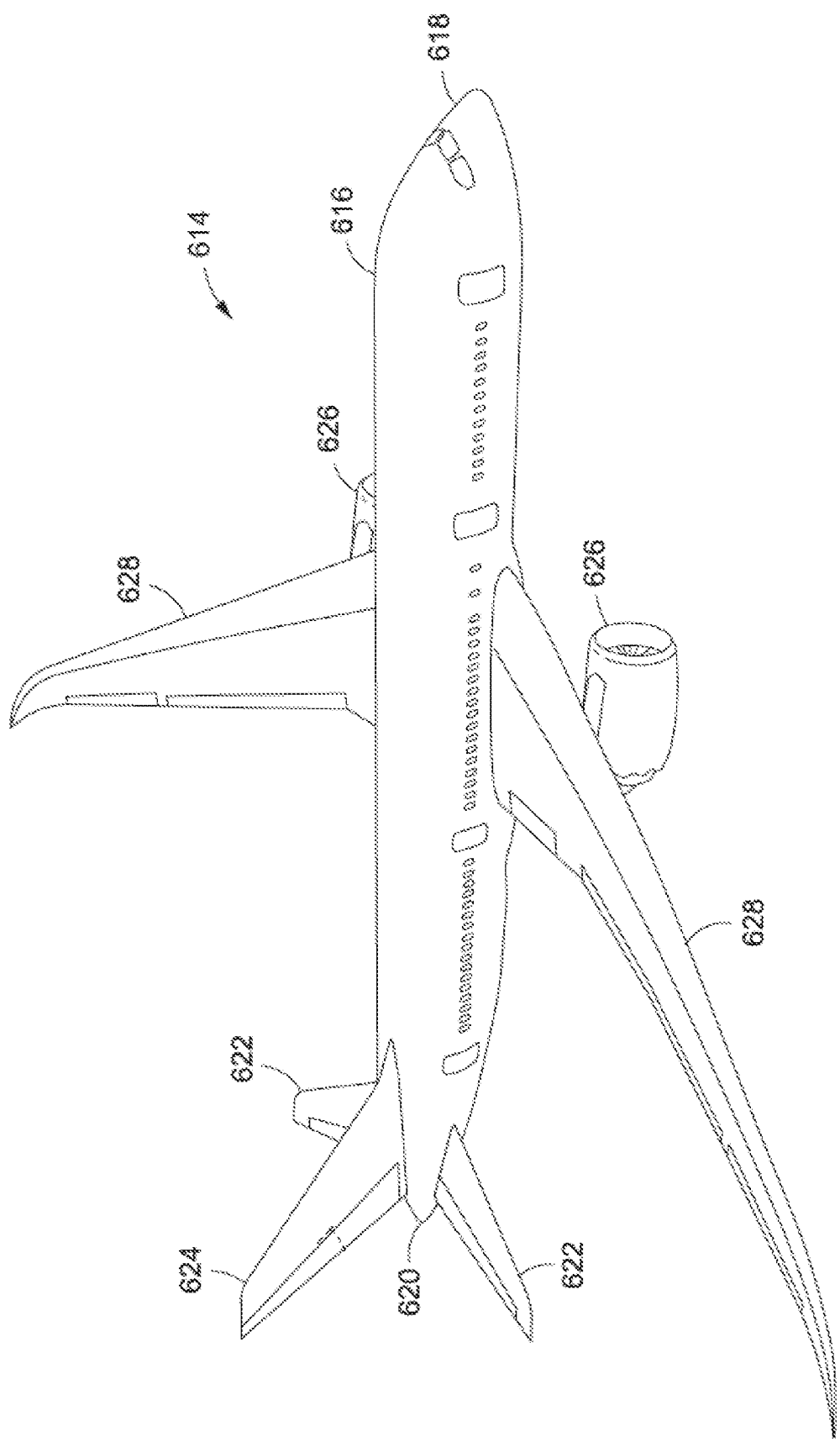
FIG. 22 is an illustration of an aircraft including one or more composite articles that may be manufactured using one or more examples of the system and/or method disclosed herein.

FIG. 22 is an illustration of a perspective view of an aircraft 614 including one or more composite articles 322 (FIG. 1) that may be manufactured using one or more examples of the system 100 (FIG. 1) and/or method 500 (FIG. 21) disclosed herein. The aircraft 614 may include a fuselage 616 having a nose 618 at a forward end and an empennage 620 at an aft end. The empennage 620 may include a vertical tail 624 and one or more horizontal tails 622. In addition, the aircraft 614 may include a pair of wings 628 extending outwardly from the fuselage 616. One or more propulsion units 626 may be included with the aircraft 614. For example, the propulsion that may be supported on the wings 628.

Although FIG. 22 is generally representative of a commercial aircraft 614, the system 100 (FIG. 1) and/or method 500 (FIG. 21) disclosed herein may be implemented for manufacturing composite articles 322 (FIG. 1) for any type of aircraft including commercial, civilian, and military aircraft including fixed-wing aircraft, rotary-wing aircraft and any one of a variety of other types of air vehicles. Furthermore, the system 100 (FIG. 1) and/or method 500 (FIG. 21) disclosed herein may be implemented for manufacturing composite articles 322 (FIG. 1) that may be used on space vehicles including, but not limited to, missiles, rockets, launch vehicles, satellites. In addition, the system 100 (FIG. 1) and/or method 500 (FIG. 21) may be implemented for manufacturing composite articles 322 (FIG. 1) for land-based vehicles including any type of motor vehicles and any type of watercraft. In this regard, the system 100 (FIG. 1) and/or method 500 (FIG. 21) may be implemented for forming composite articles 322 (FIG. 1) for any type of vehicular or non-vehicular application, without limitation, including any type of system, assembly, subassembly, or structure including buildings and other land-based structures.

Figure 23:
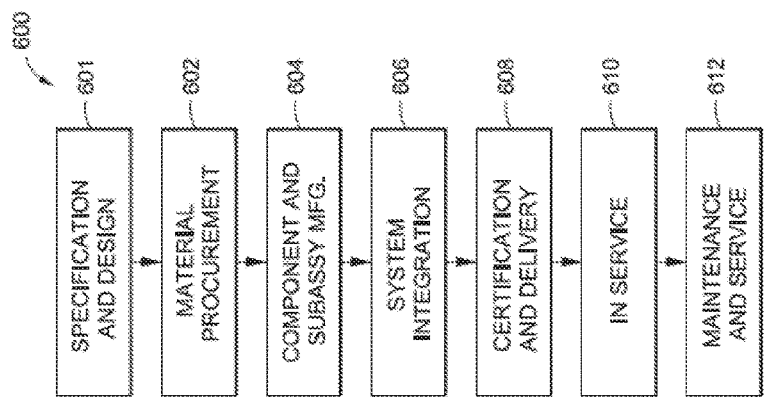
FIG. 23 is an illustration of a flow diagram of an aircraft production and service methodology.
Figure 24:
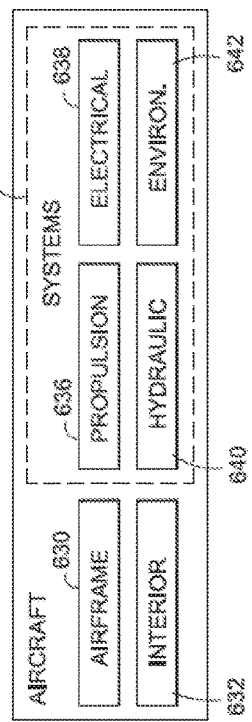
FIG. 24 is an illustration of a block diagram of an aircraft.

Referring to FIG. 23, embodiments of the present disclosure may be described in the context of an aircraft manufacturing and service method 600 as shown in FIG. 23 and an aircraft 614 as shown in FIG. 24. During pre-production, exemplary method 600 may include specification and design 601 of the aircraft 614 and material procurement 602. During production, component and subassembly manufacturing 604 and system integration 606 of the aircraft 614 takes place. Thereafter, the aircraft 614 may go through certification and delivery 608 in order to be placed in service 610. While in service 610 by a customer, the aircraft 614 is scheduled for routine maintenance and service 612 (which may also include modification, reconfiguration, refurbishment, and so on). As mentioned below, the presently-disclosed system 100 (FIG. 1) and method (FIG. 21) may be implemented during material procurement 602 and/or during production, component and subassembly manufacturing 604. For example, the system 100 (FIG. 1) and method (FIG. 21) may be implemented for production, component and subassembly manufacturing, modification, reconfiguration, and/or refurbishment of any one of a variety of different aircraft components (not shown) of the aircraft 614 including, but not limited to, the airframe 630 and/or the interior 632 of the aircraft 614.

Each of the processes of method 600 (FIG. 23) may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 24, the aircraft 614 produced by exemplary method 600 may include an airframe 630 with a plurality of high-level systems 634 and an interior 632. Examples of high-level systems 634 include one or more of a propulsion system 636, an electrical system 638, a hydraulic system 640, and an environmental system 642. Any number of other systems 634 may be included. The presently-disclosed system 100 (FIG. 1) and method 500 (FIG. 21) may be implemented during production, component and/or subassembly manufacturing 604 of the aircraft 614 (FIG. 22) and/or during system integration 606 of the aircraft 614. For example, the system 100 (FIG. 1) and/or method 500 (FIG. 21) may be implemented for manufacturing composite articles 322 (FIG. 2) that may be incorporated into the airframe 630 such as the fuselage 616 (FIG. 22), the vertical tail 624 (FIG. 22), the horizontal tails 622 (FIG. 22), and/or the wings 628 (FIG. 22). The system 100 (FIG. 1) and method 500 (FIG. 21) may also be implemented for manufacturing any one or more aircraft components that may be included in one or more high-level system 634 and/or in the interior 632 of the aircraft 614. Although an aerospace example is shown, the principles of the invention may be applied to other industries, such as the automotive industry.

Apparatus and methods embodied herein may be employed during any one or more of the stages of the production and service method 600 (FIG. 23). For example, components or subassemblies corresponding to production process may be fabricated or manufactured in a manner similar to components or subassemblies produced while the aircraft 614 (FIG. 22) is in service. Also, one or more apparatus embodiments, method embodiments, or a combination thereof may be utilized during the production stages and, for example, by substantially expediting assembly of or reducing the cost of an aircraft 614. Similarly, one or more of apparatus embodiments, method embodiments, or a combination thereof may be utilized while the aircraft 614 is in service, for example and without limitation, in maintenance and service 612 (FIG. 23).

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for manufacturing a composite article, comprising:
   a resin-wetting control layer configured to be placed in contact with a composite ply of a composite preform; and
   the resin-wetting control layer configured complementary to a ply surface of the composite ply, the ply surface having a plurality of divots, the resin-wetting control layer including a surface texture comprising a plurality of nubs spaced apart from each other and configured complementary to the plurality of divots in the ply surface.

2. The system of claim 1, wherein:
   the resin-wetting control layer is configured to reduce surface porosity of the ply surface.

3. The system of claim 1, further including:
   the resin-wetting control layer is associated with at least one of a tool surface and a caul surface of a respective forming tool and caul plate and configured complementary to the ply surface of an outermost ply on a respective tool side and caul side of the composite preform.

4. The system of claim 1, wherein:
   the resin-wetting control layer is associated with at least one of opposing core surfaces of a core configured to be sandwiched between inner plies of the composite preform, the resin-wetting control layer configured complementary to the ply surface of an inner ply on a core side of the composite preform.

5. The system of claim 1, wherein:
   the resin-wetting control layer includes a surface texture having a plurality of surface features configured complementary to the ply surface of the composite ply.

6. The system of claim 5, wherein the surface features have at least one of the following:
   a surface feature spacing in the range of approximately 0.020-0.100 inch;

a surface feature height of up to approximately 0.020 inch.

7. The system of claim 5, wherein:
the composite ply of the composite preform is formed of a woven fabric; and
the surface features are formed complementary to the woven fabric.

8. The system of claim 7, wherein:
the divots are formed at intersections of fiber tows in the woven fabric.

9. The system of claim 1, wherein:
one or more of the nubs has a nub shape that is non-symmetrical about a central vertical axis.

10. The system of claim 1, wherein:
one or more of the nubs has a truncated, pyramidal shape.

11. The system of claim 1, wherein:
the resin-wetting control layer comprises a compliant layer being compliant along a through-the-thickness direction to conform to a complex contour of the ply surface.

12. The system of claim 11, wherein:
the compliant layer comprises an elastomeric material.

13. The system of claim 11, wherein:
the compliant layer has a layer thickness in a range of from 0.002 to 0.12 inch.

14. The system of claim 1, wherein:
the resin-wetting control layer is integral with at least one of a tool surface of a forming tool, a caul surface of a caul plate, and a core surface of a core.

15. A system for manufacturing a composite article, comprising:
at least one of a forming tool and a caul plate, the forming tool having a tool surface, the caul plate having a caul surface, the tool surface and the caul surface configured to be in contact with a respective tool side and a caul side of a composite preform including an outermost ply formed of woven fabric having a plurality of divots;
a resin-wetting control layer associated with at least one of the tool surface and the caul surface and configured to reduce surface porosity in the respective tool side and caul side of the composite preform; and
the resin-wetting control layer formed as an elastomeric layer being compliant along a through-the-thickness direction and/or including a surface texture comprising a plurality of nubs spaced apart from each other and configured complementary to a geometry and spacing of the divots in the outermost ply.

16. A resin-wetting control layer for manufacturing a composite article, comprising:
a surface texture configured to be placed in contact with a composite ply of a composite preform having a plurality of divots; and
the surface texture including a plurality of nubs located complementary to the divots.

17. The resin-wetting control layer of claim 16, wherein:
one or more of the nubs has a nub shape that is symmetrical about a central vertical axis along at least one direction of the nub.

18. The resin-wetting control layer of claim 16, wherein:
one or more of the nubs has a nub shape that is non-symmetrical about a central vertical axis.

19. The resin-wetting control layer of claim 16, wherein:
one or more of the nubs has a truncated, pyramidal shape.

20. The resin-wetting control layer of claim 16, wherein the nubs have at least one of the following:
a nub spacing in the range of approximately 0.020-0.100 inch;
a nub height of up to approximately 0.020 inch.

* * * * *